US007247795B2

(12) United States Patent
Sumi et al.

(10) Patent No.: US 7,247,795 B2
(45) Date of Patent: Jul. 24, 2007

(54) SHIELD WIRE, HOUSING CONNECTED WITH SAME, CONNECTING METHOD THEREOF AND SHIELD WIRE UNIT

(75) Inventors: Toru Sumi, Hitachi (JP); Seigi Aoyama, Ibaraki (JP); Nobuyuki Yamashita, Hitachi (JP); Michiaki Shimizu, Hitachi (JP); Hiroshi Okikawa, Hitachi (JP)

(73) Assignee: Hitachi Cable. Ltd., Tokyo (JP)

( * ) Notice: Subject to any disclaimer, the term of this patent is extended or adjusted under 35 U.S.C. 154(b) by 0 days.

(21) Appl. No.: 11/293,505

(22) Filed: Dec. 5, 2005

(65) Prior Publication Data

US 2006/0137893 A1 Jun. 29, 2006

(30) Foreign Application Priority Data

Dec. 6, 2004 (JP) ............................ 2004-353271
Dec. 6, 2004 (JP) ............................ 2004-353272

(51) Int. Cl.
*H02G 15/02* (2006.01)

(52) U.S. Cl. ..................... 174/74 R; 174/75 C; 174/78

(58) Field of Classification Search .............. 174/74 R, 174/78, 84 R, 84 S, 94 R, 94 S
See application file for complete search history.

(56) References Cited

U.S. PATENT DOCUMENTS 5,012,045 A * 4/1991 Sato ....................... 174/106 R
5,691,506 A * 11/1997 Miyazaki et al. ........... 174/652
6,042,396 A * 3/2000 Endo et al. .................... 439/98
6,358,069 B2 * 3/2002 Yoshioka et al. ........... 439/108
6,583,352 B2 * 6/2003 Fukushima et al. ......... 174/373
6,781,059 B2 * 8/2004 Mizutani .................. 174/75 C
6,784,368 B2 * 8/2004 Imai et al. ................ 174/74 R
6,864,426 B2 3/2005 Miyazaki
2003/0019655 A1 * 1/2003 Gagnon .................. 174/105 R
2004/0099427 A1 5/2004 Kihira
2004/0229508 A1 * 11/2004 Miyazaki et al. ........... 439/607
2005/0011687 A1 1/2005 Yamaguchi et al.

FOREIGN PATENT DOCUMENTS

JP 2002-208456 A 7/2002
JP 2004-171952 A 6/2004
JP 2004-178913 A 6/2004
JP 2004-224156 A 8/2004

* cited by examiner

*Primary Examiner*—William H. Mayo, III
(74) *Attorney, Agent, or Firm*—Foley & Lardner LLP

(57) ABSTRACT

A shield wire has a wire main body that has a conductor and an insulation covering the conductor. The conductor has a single wire or a stranded wire. A shield member is disposed on an outer circumference of the wire main body. The shield member has a tubular body having an inner sleeve, a braided shield and an outer sleeve, and a metal pipe is disposed on the outer circumference of the wire main body. The tubular body is electrically connected to the metal pipe at an end thereof. The shield wire further has a first connector member with a flange, wherein the first connector member is electrically connected to the tubular body at an other end of the tubular body where the tubular body is not connected to the metal pipe.

20 Claims, 20 Drawing Sheets

SHIELD WIRE, HOUSING CONNECTED WITH SAME, CONNECTING METHOD THEREOF AND SHIELD WIRE UNIT

The present application is based on Japanese patent application Nos. 2004-353271 and 2004-353272, the entire contents of which are incorporated herein by reference.

BACKGROUND OF THE INVENTION

1. Field of the Invention

This invention relates to a shield wire for power supply to an apparatus and, in particular, to a shield wire for power supply to various apparatuses of an automobile.

2. Description of the Related Art

The shield wire has, outside of a covered conductor, a braided shield which is made of copper wire, tin-plated copper wire etc. with a diameter of tens to hundreds of μm. The braided shield is connected to a metallic connector at its ends, and the metallic connector is grounded, whereby shielding effect can be obtained to prevent malfunction caused by electromagnetic wave etc.

Recently, in automobiles, hybrid cars prevail and its electrical apparatuses come into wide use. Further, shield wires for various apparatuses of the automobile are used at a high voltage and large current. Thus, accordingly, as the hybrid cars prevail and the electrical apparatuses come into wide use, the number of required wiring materials (shield wires) increases. Thereupon, the shield wire needs to be easily bent to save space where they are installed.

FIG. 1 is a plain view showing a conventional shield wire. As shown, the shield wire 350 has connection terminals 356, 356 clamped at its ends, and clamp marks 356*a* are formed at the clamp portion.

FIG. 2 is a cross sectional view cut along a line a-a in FIG. 1. As shown, the shield wire 350 has, on the periphery of a conductor 357, an insulation 355, a braided shield 352, and a cover layer (insulation) 351, in this sequence from the inside out.

FIG. 3 is a cross sectional view cut along a line b-b in FIG. 1. As shown, the cover layer 351 is peeled at the ends, the braided shield 352 is folded back, and a clamp ring 353 is provided on the folded portion of the braided shield 352. A shield connector 354 is provided on the folded-back base (i.e., the boundary between the braided shield 352 and the insulation 355) of the braided shield 352. The shield connector 354 has a screw-connected terminal (not shown) for grounding.

FIG. 4 is a plain view showing a conventional shield wire unit. The shield wire unit 380 for connecting the shield wire and a transmission-side feeder housing is composed of plural (six in FIG. 4) shield wires 350 and a plastic housing 381. The housing 381 is composed of a frame member 382 with a bottom 382*a* and a housing cover 383 to cover the upper face of the frame member 382. The housing cover 383 is fixed through fixing screws 384 to the frame member 382. Recently, the frame member can be made of a metallic shield case (e.g., JP-A-2002-208456).

The frame member 382 is provided with plural openings at its sidewall. The shield wire 350 is inserted through the opening in the housing 381. Between the shield wire 350 and the opening, a waterproof cover 358 is provided to prevent the penetration of water from outside. The bottom 382*a* of the frame member 382 is made of an insulating material. Terminal bases 386 and ground terminal bases 387 are mounted on the bottom 382*a*. Although not shown, the terminal base 386 is provided with a wiring to supply current to the transmission, and the ground terminal base 387 is grounded externally.

The connection terminal 356 of the shield wire 350 is screw-connected through a washer 388 and a bolt 389 to the terminal base 386. The shield connector 354 of the shield wire 350 is screw-connected through a bolt 390 to the ground terminal base 387.

FIG. 5 is a schematic diagram showing a connection state of the conventional shield wire unit. As shown, the shield wire unit 380 is arranged such that the shield wire is connected to an inverter housing 481 on the side of the shield connector 354 (on the left side in FIG. 5), and the plural shield wires 350 are bundled and aligned through a fixing guide member 482.

However, the conventional shield wire 350 is not good in its bending property since it uses a heat-resistant resin as the insulation 355 and the entire thereof is covered with the braided shield 352. Thus, in the case of attaching the shield wire 350 to a body etc. of a car, it is difficult to bend the shield wire 350 along the shape of the attaching part. As such, it has a problem in its handling property when it is attached.

Further, when the shield connector 354 needs to be attached to the ground terminal base 387 after attaching the shield wire 350 to a predetermined location of the housing 381, the efficiency of the attaching work is not good.

Further, depending on the position where the shield wire 350 is attached, the shield wire 350 may be hit by mud or gravels and the cover layer 351 may be broken thereby.

On the other hand, when the shield wire 350 is attached near the engine of the car, it may be subjected to vibration and heat thereof. If it exceeds the limit of heat resistance, the cover layer 351 may crack and the braided shield 352 may erode or disconnect. As a result, the shield effect thereof will lower. Therefore, the cover layer 351 needs to have such a strong structure or material that can endure the vibration and heat. Especially when the shield wire is connected to the feeder housing on the transmission side, large current needs to pass through it. The braided shield 352 for the shielding is also subjected to current flow. Therefore, the braided shield 352 may generate heat, and resistivity may increase at the connection part between the feeder housing and the shield wire. Further, due to the heat generated by the braided shield 352, the cover layer 351 may crack.

SUMMARY OF THE INVENTION

It is an object of the invention to provide a shield wire that offers good bending property, shock resistance, and heat resistance.

It is another object of the invention to provide a housing to be connected with the shield wire, a method of connecting the shield wire with the housing, and a shield wire unit using the shield wire.

(1) According to one aspect of the invention, a shield wire comprises:

a wire main body that comprises a conductor and an insulation covering the conductor, the conductor comprising a single wire or a stranded wire; and a shield member that is disposed on an outer circumference of the wire main body, wherein the shield member comprises a tubular body comprising an inner sleeve, a braided shield and an outer sleeve, and a metal pipe being disposed on the outer circumference of the wire main body, the tubular body is electrically connected to the metal pipe at an end thereof, and the shield wire further comprises a first connector member with a flange, wherein the first connector member is electrically connected to the tubular body at an other end of the tubular body where the tubular body is not connected to the metal pipe.

In the above invention, the following modifications and changes can be made.

(i) The first connector member comprises a tubular body connecting portion and an apparatus connecting portion, and the flange of the first connector member is sandwiched by the tubular body connecting portion and the apparatus connecting portion.

(ii) The braided shield comprises copper or copper alloys, and the metal pipe and the first connector member comprise aluminum or aluminum alloys.

(iii) The braided shield, the metal pipe and the first connector member comprise aluminum or aluminum alloys.

(iv) The shield wire further comprises a tubular second connector member, wherein the second connector member is inserted into the metal pipe at an end of the metal pipe where the metal pipe is not connected to the tubular body.

(v) The metal pipe comprises a cone-shaped diameter-increasing portion formed at the end of the metal pipe where the metal pipe is not connected to the tubular body.

(vi) The second connector member comprises a nut member with a female-threaded portion on an inner face thereof.

(vii) The second connector member comprises a nut member with a male-threaded portion on an outer face thereof.

(viii) The braided shield comprises copper or copper alloys, and the metal pipe, the first connector member and the second connector member comprise aluminum or aluminum alloys.

(ix) The braided shield, the metal pipe, the first connector member and the second connector member comprise aluminum or aluminum alloys.

(2) According to another aspect of the invention, a housing comprises:

a convex shield wire connecting portion for connecting the housing with a shield wire that comprises a wire main body that comprises a conductor and an insulation covering the conductor, the conductor comprising a single wire or a stranded wire, and a shield member that is disposed on an outer circumference of the wire main body, wherein the housing comprises a metal, the shield wire connecting portion comprises a wire main body inserting hole into which the wire main body is inserted.

In the above invention, the following modifications and changes can be made.

(x) The housing and the shield wire connecting portion comprise aluminum or aluminum alloys.

(xi) The shield wire connecting portion comprises a protrusion for connecting the shield wire, and the protrusion comprises a threaded portion through which the shield wire is screw-connected to the shield wire connecting portion.

(3) According to another aspect of the invention, a method of connecting a shield wire with a housing comprises the steps of:

providing the shield wire that comprises: a wire main body that comprises a conductor and an insulation covering the conductor, the conductor comprising a single wire or a stranded wire; and a shield member that is disposed on an outer circumference of the wire main body, wherein the shield member comprises a tubular body comprising an inner sleeve, a braided shield and an outer sleeve, and a metal pipe being disposed on the outer circumference of the wire main body;

providing the housing that comprises a convex shield wire connecting portion for connecting the shield wire with the housing, wherein the housing comprises a metal, the shield wire connecting portion comprises a wire main body inserting hole into which the wire main body is inserted;

electrically connecting the tubular body to the metal pipe;

inserting a second connector member into the metal pipe at an end of the metal pipe where the metal pipe is not connected to the tubular body;

electrically connecting a first connector member with a flange to the tubular body at an end of the tubular body where the tubular body is not connected to the metal pipe;

abutting the metal pipe to the shield wire connecting portion at the end of the metal pipe where the metal pipe is not connected to the tubular body; and mechanically connecting the second connector member to the shield wire connecting portion.

In the above invention, the following modifications and changes can be made.

(xii) The inserting step is followed by increasing a diameter of the metal pipe at the end thereof where the metal pipe is not connected to the tubular body to be cone-shaped.

(xiii) The abutting step is conducted such that the end of the metal pipe where the metal pipe is not connected to the tubular body is seated to the wire main body inserting hole of the shield wire connecting portion.

(xiv) The mechanically connecting step is conducted such that a female-threaded portion formed on an inner face of the second connector member is screw-connected to a male-threaded portion formed on an outer face of the shield wire connecting portion.

(xv) The mechanically connecting step is conducted such that a male-threaded portion formed on an outer face of the second connector member is screw-connected to a female-threaded portion formed on an inner face of the shield wire connecting portion.

(4) According to another aspect of the invention, a shield wire unit comprises:

a shield wire; and a housing connected with the shield wire, wherein the shield wire comprises: a wire main body that comprises a conductor and an insulation covering the conductor, the conductor comprising a single wire or a stranded wire; and a shield member that is disposed on an outer circumference of the wire main body, wherein the shield member comprises a tubular body comprising an inner sleeve, a braided shield and an outer sleeve, and a metal pipe being disposed on the outer circumference of the wire main body, the housing comprises a convex shield wire connecting portion for connecting the shield wire with the housing, wherein the housing comprises a metal, the shield wire connecting portion comprises a wire main body inserting hole into which the wire main body is inserted, the tubular body is electrically connected to the metal pipe, a first connector member with a flange is electrically connected to the tubular body at an end of the tubular body where the tubular body is not connected to the metal pipe, a second connector member is inserted into the metal pipe at an end of the metal pipe where the metal pipe is not connected to the tubular body, the metal pipe is abutted to the shield wire connecting portion at an end of the metal pipe where the metal pipe is not connected to the tubular body; and the second connector member is mechanically connected to the shield wire connecting portion.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Figure 6:
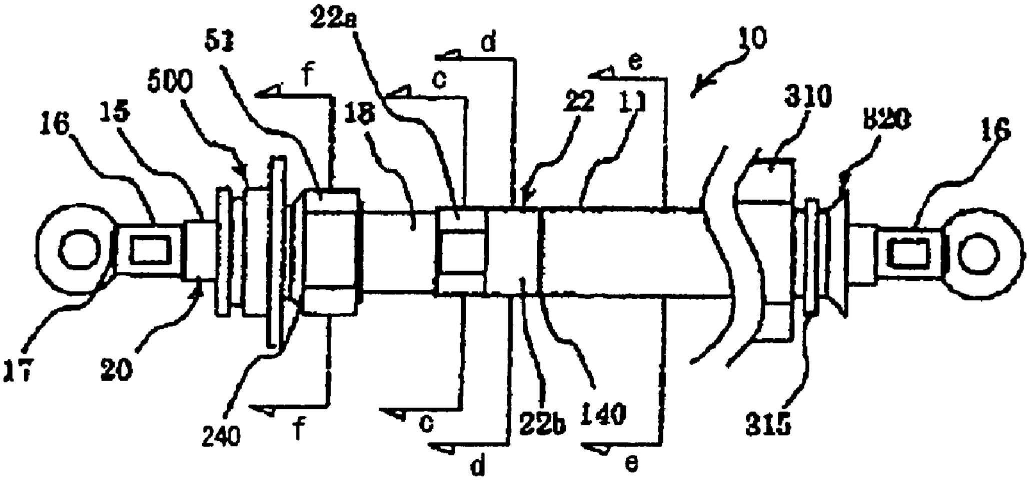
FIG. 6 is a plain view showing a shield wire in a preferred embodiment of the invention.

FIG. 6 is a plain view showing a shield wire in the preferred embodiment of the invention.

Composition of Shield Wire

As shown, the shield wire of this embodiment is composed such that a shield member is disposed around a wire main body 20 that a conductor 17 formed of single wire or stranded wire is covered with an insulation 15. The shield wire is provided with connection terminals 16, 16 at its both ends. One of the connection terminals 16, 16 (on the left side in FIG. 6) is connected to an inverter side as described later, and the other (on the right side in FIG. 6) is connected to a transmission side as described later.

Shield Member

Figure 10:
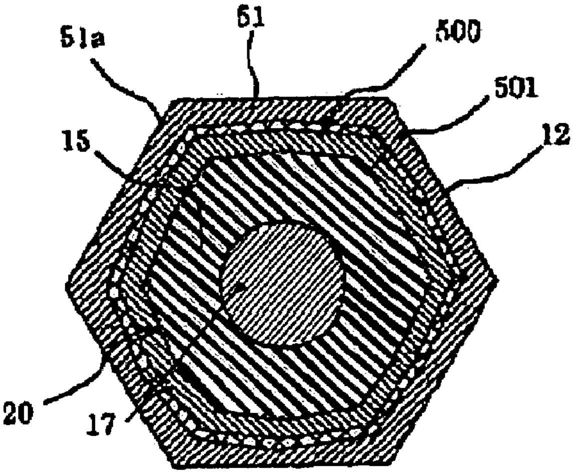
FIG. 10 is a cross sectional view cut along a line f-f in FIG. 6.
Figure 11:
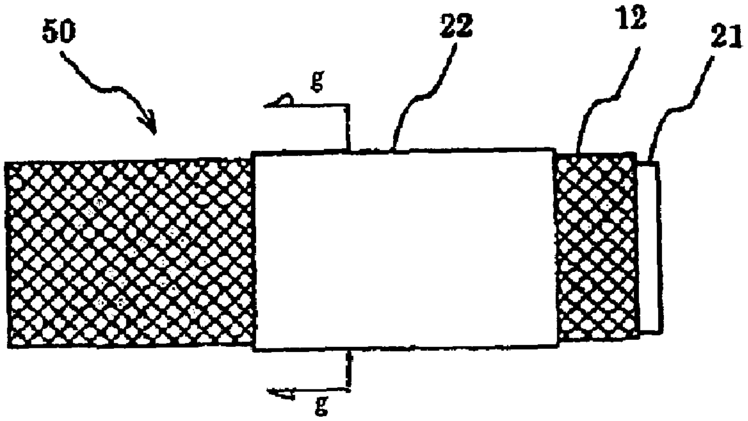
FIG. 11 is a plain view showing a tubular body.
Figure 16:
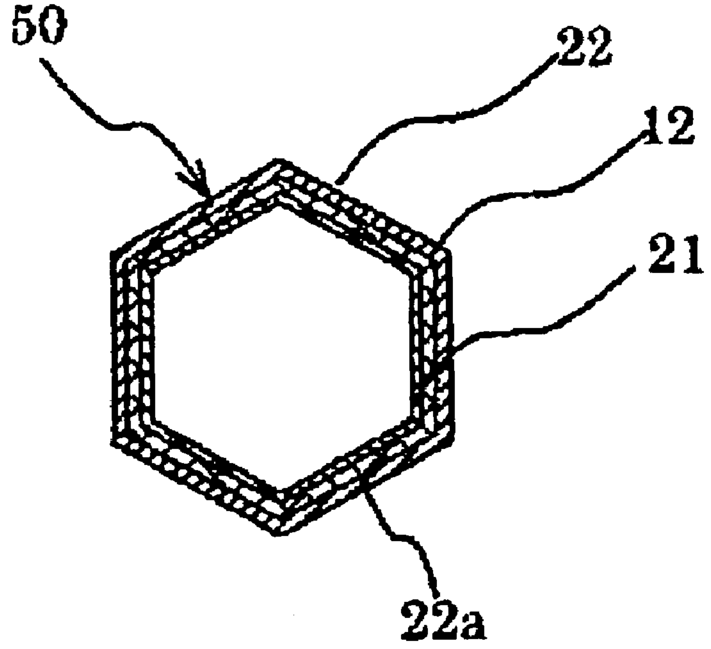
FIG. 16 is a cross sectional view cut along a line h-h in FIG. 15.

The shield member is composed of a tubular body 50 as shown in FIGS. 10 and 11 and a metal pipe 11 as shown in FIG. 16. The shield member is formed by abutting the tubular body 50 to the metal pipe 11 and then electrically connecting the tubular body 50 through a weld portion to the metal pipe 11. As shown in FIGS. 10 and 11, the tubular body 50 is made by forming, around an inner sleeve 21, a braided shield 12 and an outer sleeve 22 in this order. The braided shield 12 is an elongated member extending over the entire length of the tubular body 50. The inner sleeve 21 and the outer sleeve 22 are short members to cover a part near the transmission-side end of the tubular body 50.

Figure 7:
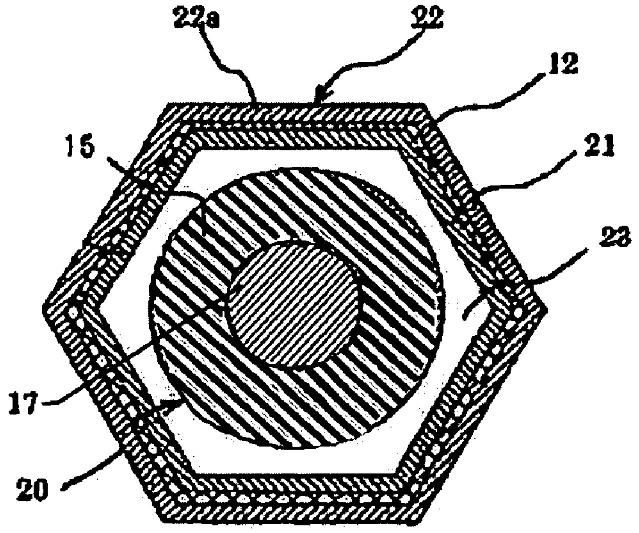
FIG. 7 is a cross sectional view cut along a line c-c in FIG. 6.
Figure 9:
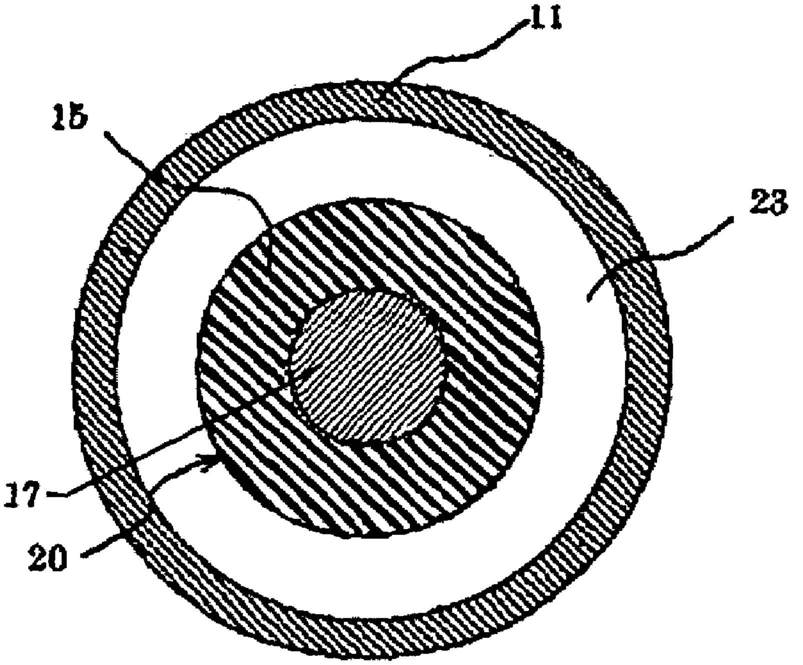
FIG. 9 is a cross sectional view cut along a line e-e in FIG. 6.

The shield layer of the shield member is varied in cross section along the longitudinal direction of the shield wire. In detail, it is varied bordering at the outer sleeve 22 of the tubular body 50. The shield layer is formed of the braided shield 12 on the inverter side as shown in FIG. 7 and is formed of the metal pipe 11 on the transmission side as shown in FIG. 9. Thus, the cross sectional form of outer sleeve 22 is varied long the longitudinal direction.

The outer sleeve 22 has, on the inverter side, a molded portion **22*a* formed of a polygon (hexagon in FIG. 7) in its cross section as shown in FIG. 7. The outer sleeve 22 has, on the transmission side, a non-molded portion 22*b* formed of a circle in its cross section as shown in FIG. 8**.

Figure 8:
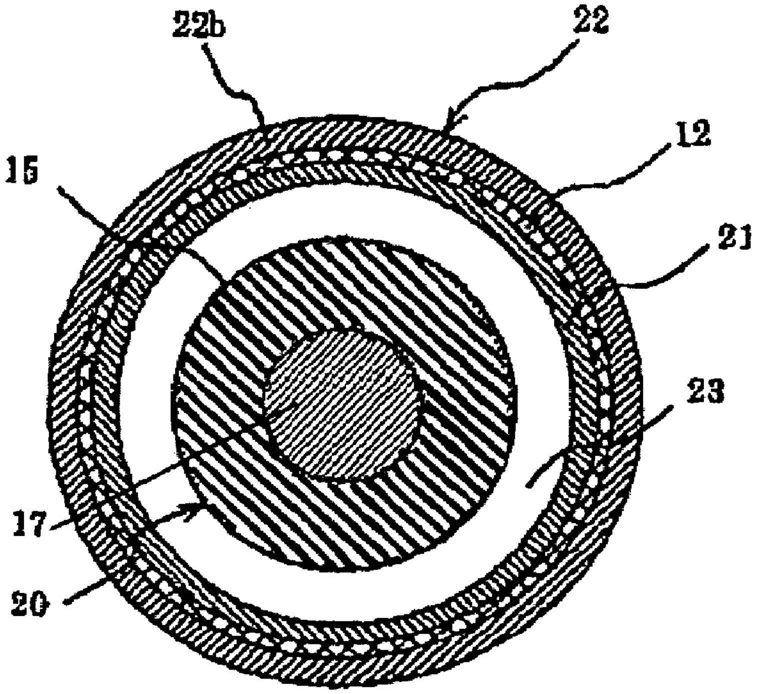
FIG. 8 is a cross sectional view cut along a line d-d in FIG. 6.

The shield member is disposed surrounding the wire main body 20 and is provided with a space 23 to house the wire main body 20 inside thereof (See FIGS. 7 to 9). Namely, there is a gap between the wire main body 20 and the shield member. Thereby, the shield wire can have an excellent bending property and the wire main body 20 is not subject to any stress when the shield wire is bent.

Figure 36:
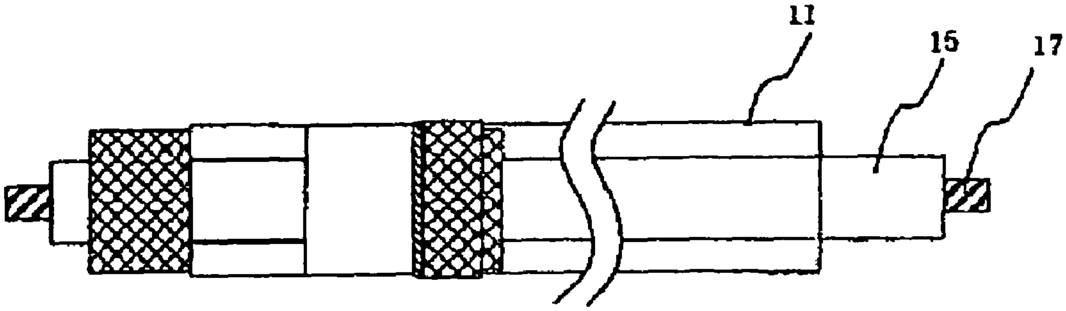
FIG. 36 is an enlarged plain view showing a main part of the shield wire in FIG. 6.
Figure 37:
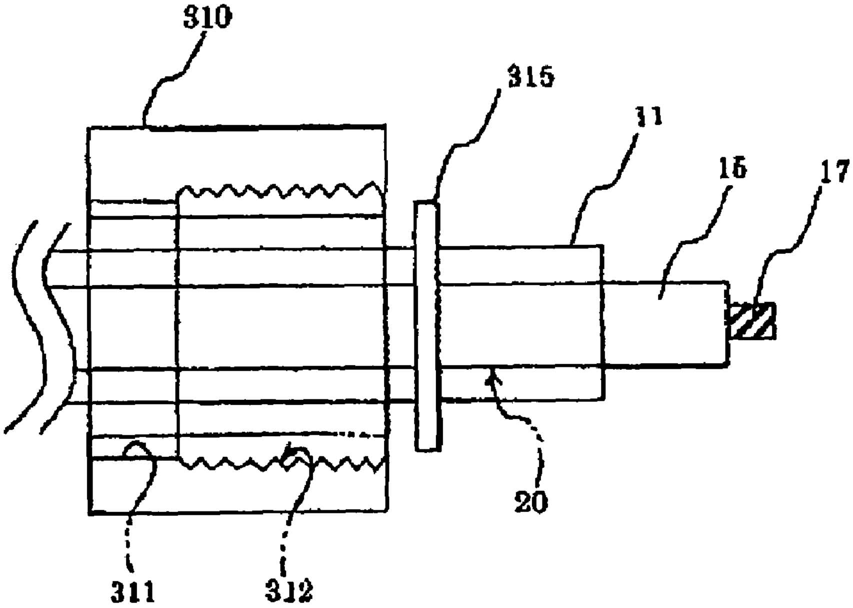
FIG. 37 is a plain view showing a state of inserting a connection member on the non-tubular body side of the metal pipe in the shield wire.

At the transmission-side end (on the right side in FIG. 36) of the shield wire as shown in FIG. 36, a tubular connection member 310 (e.g., an elongated nut member, herein also called second connector member) and a washer 315 are in sequence inserted on the non-tubular body side (i.e., on the transmission side or on the right side in FIG. 37). The connection member 310 is provided with a female-threaded portion 312 on the transmission side of its inner face 311. After the connection member 310 and the washer 315 are inserted, a cone-shaped diameter-increasing portion 320 is formed on the transmission side end of the metal pipe 11. Due to the diameter-increasing portion 320, the connection member 310 and the washer 315 can be prevented from being slipped out. An inner face 311 of the connection member 310 has an inside diameter slightly greater than the outside diameter of the metal pipe 11. The female-threaded portion 312 may be formed on a part in the longitudinal direction (lateral direction in FIG. 37) of the inner face 311 or all over the longitudinal direction of the inner face 311.

The tubular body 50 is provided with a clamp ring 51 near the inverter side end of the braided shield 12. The clamp ring 51 has a molded portion **51*a* formed of a polygon (a hexagon in FIG. 10) as shown in FIG. 10. The braided shield 12 between the clamp ring 51 and the outer sleeve 22 is covered with an insulating coat 18**.

Figure 42:
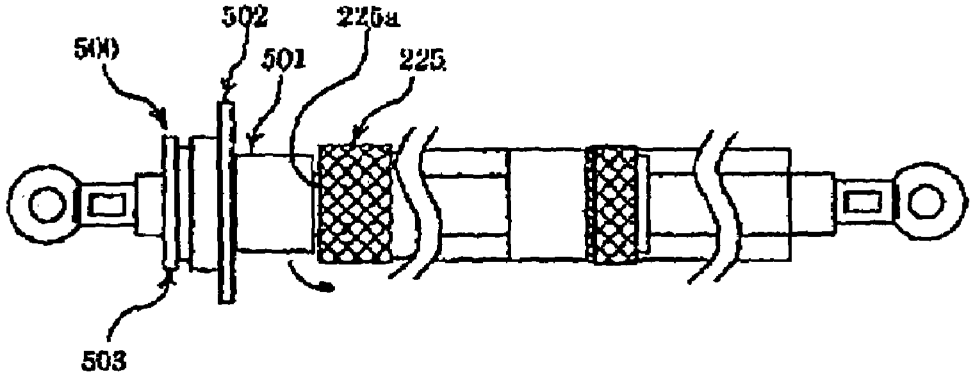
FIG. 42 is a plain view showing a process of folding back an exposed shield in connecting the tubular body to a connector member.

A shield connector 500 (herein also called connector member or first connector member) is provided on the inverter side end (on the non-metal pipe side of the tubular body 50) of the braided shield 12. As shown in FIG. 42, the shield connector 500 has a tubular body connecting portion 501 on the transmission side and an apparatus connecting portion 503 on the inverter side, which sandwich a flange 502. The ground connection is formed through the flange 502 and the apparatus connecting portion 503.

The outer sleeve 22, the metal pipe 11, the connection member 310, the washer 315 and the shield connector 500 are preferably made of the same material or materials with nearly equal chemical composition. For example, the material can be aluminum or aluminum alloy, preferably Al—Si—Mg alloys with good corrosion resistance and brazing property. The outer sleeve 22 and the metal pipe 11 can be a tubular material made of A6063 and with an inside diameter of 10 mm and a thickness of 1 mm. The connection member 310 can be a nut member made of A6063 and with an inside diameter of 16 mm. The washer 315 can be made of A6063 and have an outside diameter of 14 mm, an inside diameter of 12 mm and a thickness of 2 mm. The shield connector 500 can be made of A6063 and have the same diameter and thickness as the inner sleeve 21.

When the metal pipe 11 is made of aluminum or aluminum alloy, it can be lighter in weight and it can protect the wire main body 20 from heat even when the shield wire is disposed near an apparatus to generate the heat. This is because heat from the braided shield 12 can be efficiently radiated therethrough. The reason why the outer sleeve 22, the metal pipe 11, the connection member 310, the washer 315 and the shield connector 500 are made of the same material or materials with nearly equal chemical composition is that the bonding can be formed between the same kinds of metals. When the bonding is formed between different kinds of metals, corrosion may occur due to a potential difference caused by moisture penetrated to the bonding portion.

The inner sleeve 21 can be made of stainless steel, preferably austenitic stainless steel. For example, the inner sleeve 21 can be a tubular material made of SUS304 (JIS code) and with an outside diameter of 9 mm and a thickness of 0.2 mm.

The braided shield 12 can be made of copper, copper alloy, aluminum or aluminum alloy, preferably copper or copper alloy. All coppers or copper alloys conventionally used for braided shields are available for the braided shield 12. The aluminum alloy may be Al—Fe—Zr alloys with good heat resistance, bending resistance and stretching property. For example, it may be a braid of a wire made of Al—Fe—Zr alloy and with a diameter of 0.2 mm. For example, the length of the braided shield 12 may be 200 mm although it varies depending on the use and installation place of the shield wire.

Other Components

The conductor 17 may be a single wire or stranded wire with plural wires stranded, and may be all kinds of conductors conventionally used for the shield wire. For example, the stranded wire (conductor 17) is formed by stranding 19 core wires each of which is formed by stranding 19 tin-plated copper wires with an outside diameter of 0.32 mm. The insulation 15 covering the conductor 17 may be all insulations conventionally used for the shield wire, e.g., Fluonrex (registered trademark).

The connection terminal 16 may be all kinds of conductors conventionally used for the shield wire. For example, it can be 38-S6, wire holding part of which is 9.4 mm in inside diameter, 13.3 mm in outside diameter and 14 mm in length.

Shield Wire Making Process

A process of making the shield wire of the embodiment will be described below.

Figure 12:
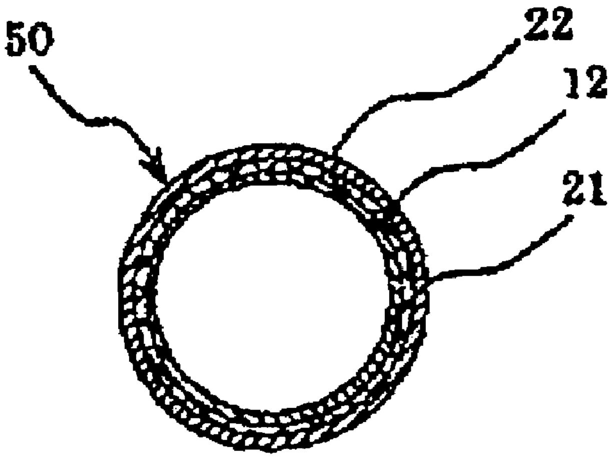
FIG. 12 is a cross sectional view cut along a line g-g in FIG. 6.
Figure 13:
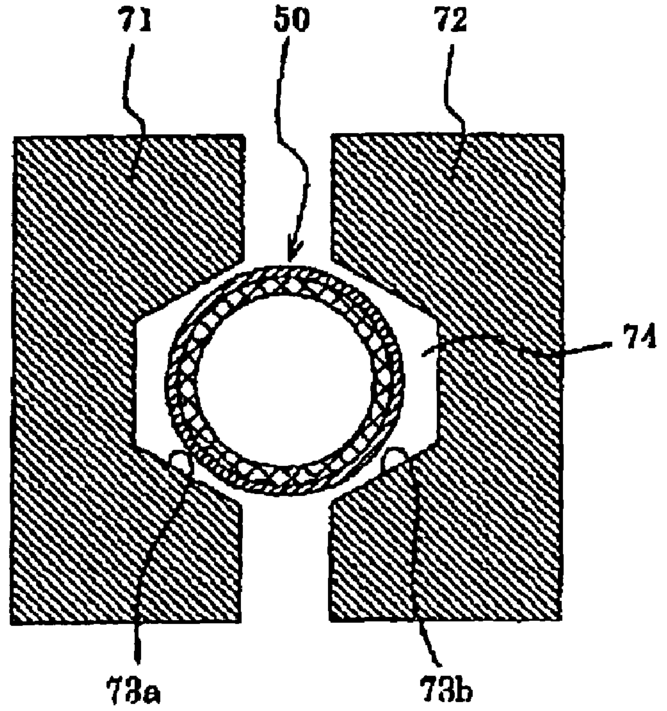
FIG. 13 is a cross sectional view showing a state before conducting the compression molding of the tubular body.

First, the tubular body 50 as shown in FIGS. 11 and 12 is provided, and it is placed in a space 74 defined by die faces 73*a*, 73*b* of compressing dies 71, 72 as shown in FIG. 13. At this stage, the outer sleeve 22 on the inverter side is placed in the space 74.

Figure 14:
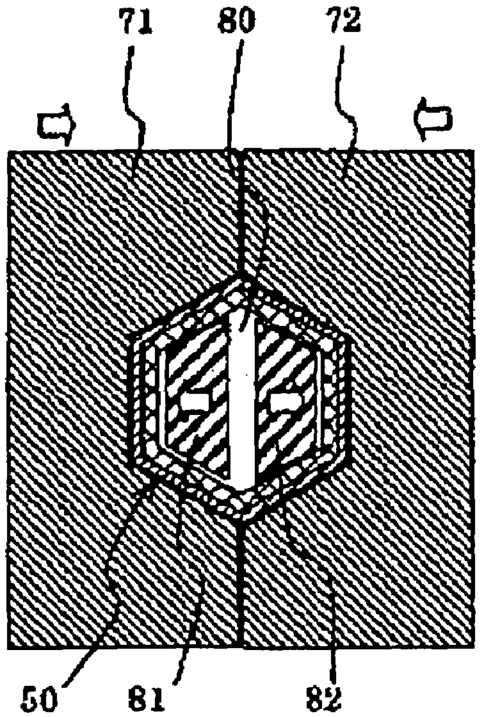
FIG. 14 is a cross sectional view showing a process of conducting the compression molding of the tubular body.
Figure 15:
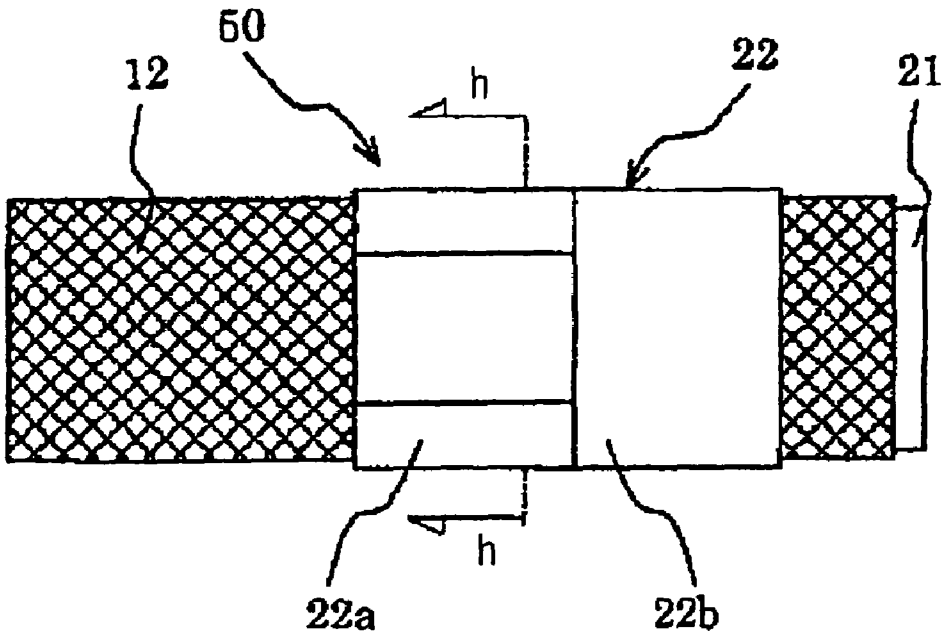
FIG. 15 is a plain view showing the tubular body after conducting the compression molding.

Then, as shown in FIG. 14, the compression molding is conducted to the outer sleeve 22 from the outside by moving the compressing dies 71, 72 to come close to each other. Then, dies 81, 82 are inserted into an inside space 80 of the tubular body 50 at the part subjected to the compression molding, and the compression molding is conducted to the outer sleeve 22 from the inside and outside thereof. Thereby, as shown in FIGS. 15 and 16, a part of the outer sleeve 22 is formed as the molded portion 22*a* in which the braided shield 12 and the outer sleeve 22 are mechanically bonded by being compressed through the dies 71, 72 and 81, 82. The remaining part of the outer sleeve 22 is formed as the non-molded portion 22*b*.

The molded portion 22*a* is formed so as to secure the contact area of the outer sleeve 22 to the braided shield 12 to increase the electrical contact. Further, the molded portion 22*a* is formed so as to secure the mechanical strength of the braided shield 12 at the molded portion 22*a* by integrally bonding the braided shield 12 and the outer sleeve 22.

Figure 17:
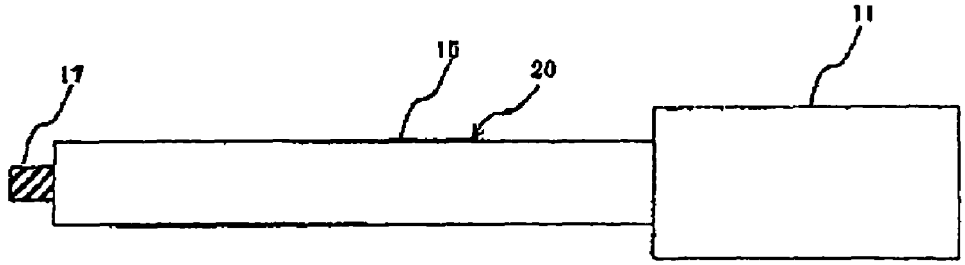
FIG. 17 is a plain view showing a process of inserting a wire main body into a metal pipe.

On the other hand, as shown in FIG. 17, the wire main body 20 with the conductor 17 covered with the insulation 15 is provided. The metal pipe 11 is inserted into one end (on the right side in FIG. 17) of the wire main body 20. A predetermined bending process is conducted to the metal pipe 11 while keeping the wire main body 20 inserted into the metal pipe 11, prior to a welding process as described later. The bonding process may be conducted after the welding process.

Figure 18:
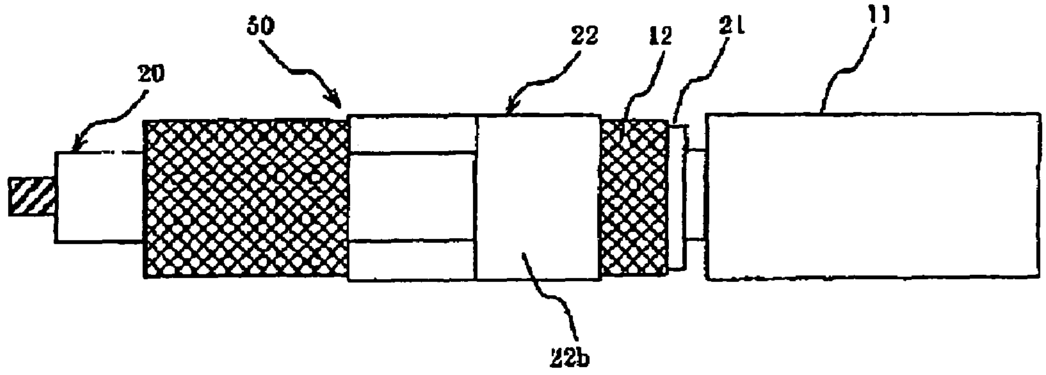
FIG. 18 is a plain view showing a process of abutting the tubular body in FIG. 15 to the metal pipe in FIG. 17.

Then, as shown in FIG. 18, the other end (on the left side in FIG. 18) of the wire main body 20 is inserted into the tubular body 50 as shown in FIG. 14. Thereby, the non-molded portion 22*b* of the outer sleeve 22 in the tubular body 50 is abutted to the metal pipe 11.

Figure 19:
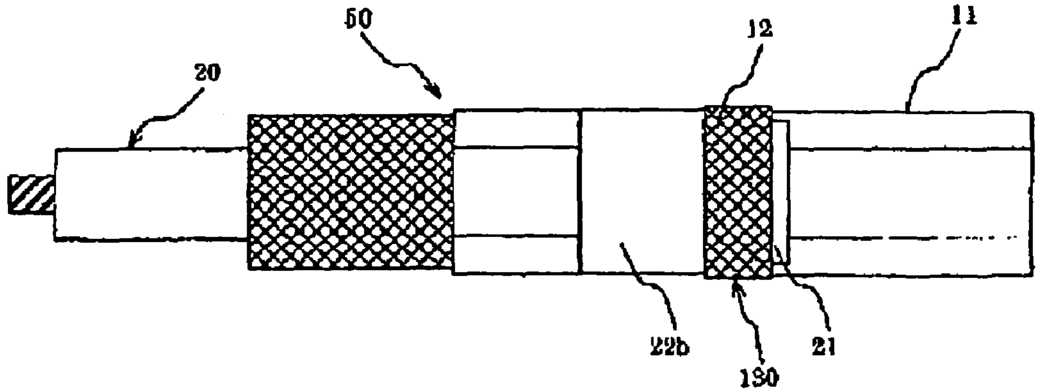
FIG. 19 is a plain view showing a process of connecting the tubular body to the metal pipe.

Then, as shown in FIG. 19, the braided shield 12 exposed (hereinafter called exposed shield 130) from the non-molded portion 22*b* of the tubular body 50 is expanded outward in the radial direction, and the metal pipe 11 is inserted between the braided shield 12 and the inner sleeve 21 such that the non-molded portion 22*b* of the outer sleeve 22 is nearly in contact with the metal pipe 11. Thereby, the exposed shield 130 is put on the tubular body side end of the metal pipe 11 (on the left end thereof in FIG. 19).

Figure 20:
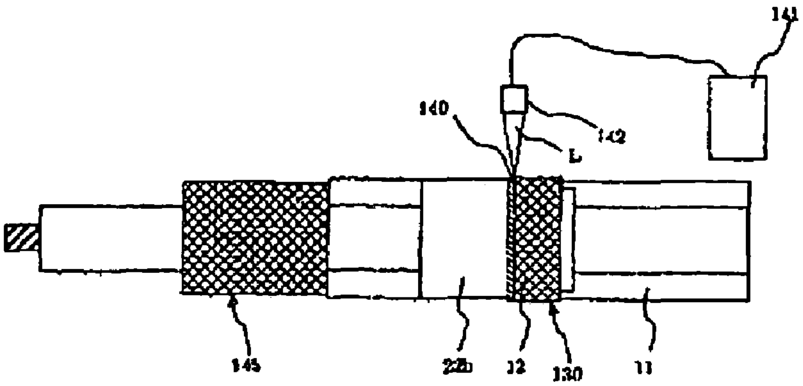
FIG. 20 is a plain view showing a process of welding the tubular body with the metal pipe.

Then, as shown in FIG. 20, using laser light L outputted from a laser welding head 142 of a laser welder 141 (e.g., YAG laser welder), the non-molded portion 22*b* of the outer sleeve 22 is bonded in laser welding to the proximal part of the metal pipe 11. Thus, in the proximal part, the end face of the outer sleeve 22 is welded through the braided shield 12 to the end face of the metal pipe 11. The welding is conducted continuously all around the circumference of the proximal part. Thereby, the metal pipe 11, the outer sleeve 22 and the braided shield 12 are securely welded at a welded portion 140 to allow the metal bonding therebetween. As a result, corrosion or heat generation can be suppressed at the welded portion 140. Further, the electrical connection can be secured among the metal pipe 11, the outer sleeve 22 and the braided shield 12 by welding the proximal part while putting the exposed shield 130 on the tubular body side end of the metal pipe 11.

Then, the exposed shield 130 and the braided shield 12 exposed (hereinafter called exposed shield 145) from the molded portion 22*a* of the tubular body 50 are insulated. For example, a heat-shrinkable tube is provided which has a length sufficient to cover each of the exposed shield 130 and the exposed shield 145. After covering the exposed shields 130, 145 with the heat-shrinkable tube, the heat-shrinkable tube is shrunk by hot-air blow to be closely in contact with the shield members to insulate them.

Then, as described earlier referring to FIGS. 36 to 38, after the connection member 310 and the washer 315 are inserted in sequence on the transmission side end of the shield wire, the cone-shaped diameter-increasing portion 320 is formed on the transmission side end of the metal pipe 11.

Figure 41:
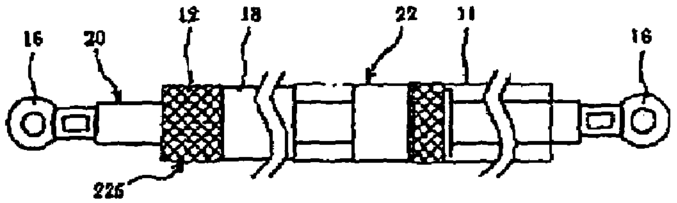
FIG. 41 is a plain view showing a state after welding the tubular body with the metal pipe.

Then, as shown in FIG. 41, the insulating coat 18 is partially peeled on the inverter side (on the left side in FIG. 41) to expose the braided shield 12 (hereinafter called exposed shield 225) thereat. The connection terminals 16, 16 are connected to both ends of the conductor 17 in the wire main body 20. Further, the clamp ring 51 is inserted from the transmission side of the wire main body 20 and located nearer the transmission side in relation to the exposed shield 225.

Figure 43:
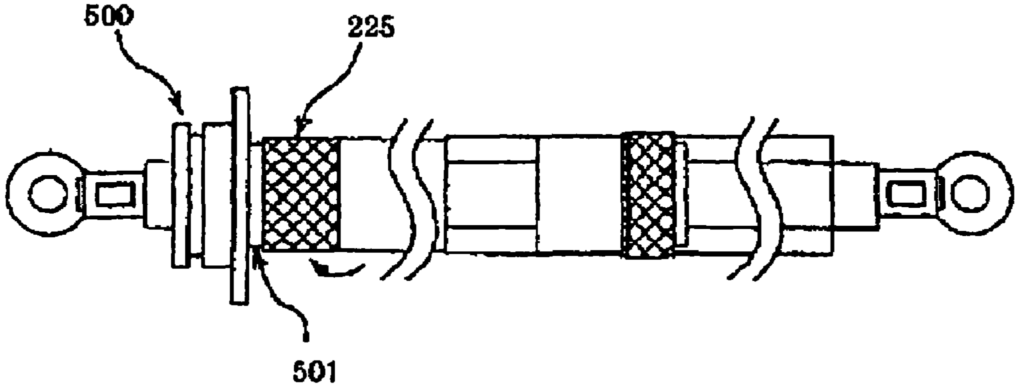
FIG. 43 is a plain view showing a process of setting back the exposed shield.

Then, as shown in FIG. 42, the exposed shield 225 is folded back on the insulating coat 18. Then, the shield connector 500 is inserted from the inverter side of the wire main body 20 such that the tubular body connecting portion 501 is abutted to (or nearly in contact with) a folded-back base 225*a* of the exposed shield 225. Then, as shown in FIG. 43, the folded exposed shield 225 is set back to be put on the tubular body connecting portion 501.

Figure 44:
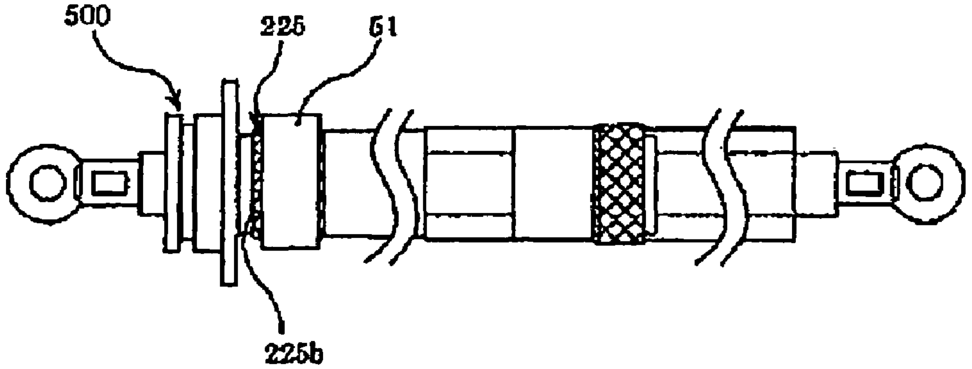
FIG. 44 is a plain view showing a process of covering a clamp ring on the exposed shield.
Figure 45:
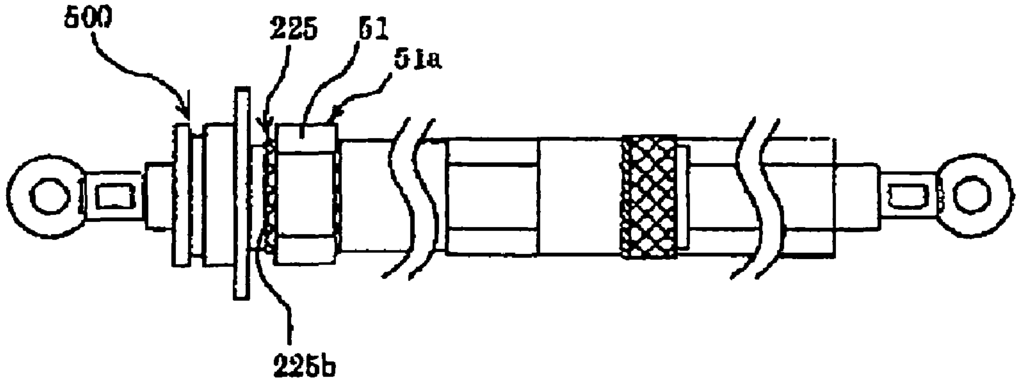
FIG. 45 is a plain view showing a state after conducting the compression molding of the clamp ring.

Then, as shown in FIG. 44, the clamp ring 51 being previously inserted is shifted to be put on the exposed shield 225. In this process, an end 225*b* of the exposed shield 225 is exposed shifted from the clamp ring 51. Then, the clamp ring 51 is subjected to compression molding such that it has a molded portion 51*a* formed of a polygon (hexagon in FIG. 10) in its cross section as shown in FIG. 45.

Thus, the compression molding of the clamp ring 51 is conducted so as to secure the contact area of the tubular body connecting portion 501 to the exposed shield 225 to increase the electrical contact. Further, it is conducted so as to secure the mechanical strength of the exposed shield 225 at the clamp ring 51 by integrally bonding the exposed shield 225 and the tubular body connecting portion 501.

Figure 46:
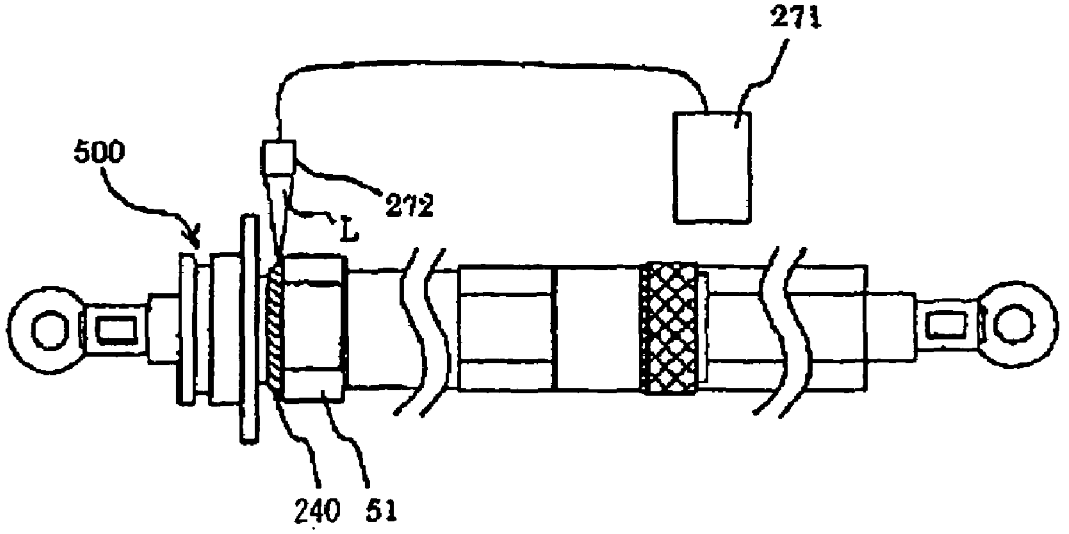
FIG. 46 is a plain view showing a process of welding the clamp ring with the connector member.

Then, as shown FIG. 46, using laser light L outputted from a laser welding head 272 of a laser welder 271 (e.g., YAG laser welder), the molded clamp ring 51 is bonded in laser welding to the tubular body connecting portion 501. The welding is conducted continuously all around the circumference of the tubular body connecting portion 501. Thereby, the tubular body connecting portion 501, the clamp ring 51 and the exposed shield 225 are securely welded at a welded portion 240 to allow the metal bonding therebetween. As a result, corrosion or heat generation can be suppressed at the welded portion 240. Further, the electrical connection can be secured among the tubular body connecting portion 501, the clamp ring 51 and the exposed shield 225 by welding the end 225*b* while putting the exposed shield 225 on the tubular body connecting portion 501.

Finally, the tubular body connecting portion 501, the clamp ring 51 and the exposed shield 225 are insulated. For example, a heat-shrinkable tube is provided which has a length sufficient to cover these members. After covering these members with the heat-shrinkable tube, the heat-shrinkable tube is shrunk by hot-air blow to be closely in contact with these members to have an insulating coat 281 formed thereon. Thus, the shield wire 10 of the embodiment can be obtained.

In the shield wire 10, the connection terminal 16 on the side (on the left side in FIG. 47) where the shield connector 500 is connected is connected to an inverter housing (not shown; which is made of, e.g., aluminum or aluminum alloy), and the connection terminal 16 on the side (on the right side in FIG. 47) where the metal pipe 11 is connected is connected to a transmission housing (not shown).

Effects of the Shield Wire in the Embodiment

In the shield wire 10 of the embodiment, the shield layer composing the shield member is not constructed by the metal pipe 11 all over the longitudinal direction, but it is constructed by the metal pipe 11, which has high strength and good heat resistance, on one side (e.g., on the transmission side) that may be subjected to strong vibration and high temperature and it is constructed by the braided shield 12 on the other side (e.g., on the inverter side).

If the entire shield layer is constructed by the metal pipe 11, the shield member has good heat resistance all over the length of the shield wire. However, it is not desirable since the vibration shock concentrates on the connection part of the shield wire to the transmission side.

In view of this, the shield wire 10 of the embodiment employs such a hybrid structure that the braided shield 12 with flexibility is partially used to prevent the concentration of the shock as well as the metal pipe 11.

The shield wire 10 of the embodiment is formed such that the outer sleeve 22 on the inverter side of the tubular body 50 and the clamp ring 51 have the molded portions 22*a* and 51*a*, respectively, formed of a polygon in cross section by the compression molding. Thereby, the contact area, i.e., electrical contact can be sufficiently secured between the outer sleeve 22 and the braided shield 12 and between the clamp ring 51 and the exposed shield 225 (braided shield 12).

Meanwhile, the outer sleeve 22, the metal pipe 11 and the braided shield 12 are fusion-bonded each other. Also, the shield connector 500, the braided shield 12 and the clamp ring 51 are fusion-bonded each other. Therefore, current to flow through the braided shield 12 as the shield member is flown from the shield connector 500 through the braided shield 12 and the outer sleeve 22 to the metal pipe 11. Joule heat is generated in the braided shield 12 since large current flows therethrough. If the electrical contact is not sufficient between the clamp ring 51 and the exposed shield 225 and between the outer sleeve 22 and the braided shield 12, the resistivity of the braided shield 12 and the outer sleeve 22 increases since current is hard to flow therethrough. Therefore, temperature increases at the welded portion 240 of the shield connector 500, the braided shield 12 and the clamp ring 51 and at the welded portion 140 of the braided shield 12, the outer sleeve 22 and the metal pipe 11. It creates a vicious cycle that, due to the temperature increase, the resistivity of the welded portions 140, 240 further increases. As a result, the welded portions 140, 240 may be melted to deteriorate the bonding between the shield connector 500 and the tubular body 50 and between the tubular body 50 and the metal pipe 11. However, in the embodiment, the above problem can be effectively avoided since the electrical contact therebetween can be sufficiently secured by the molded portions 22*a* and 51*a* formed by the compression molding.

Further, the shield wire 10 of this embodiment is formed such that the outer sleeve 22 of the tubular body 50 composing the shield member has, on the transmission side, the non-molded portion 22*b* formed of a circle in cross section without being shaped by the compression molding. Therefore, the tubular body 50 can be easily and surely bonded to the metal pipe 11 formed of a circle in cross section.

Further, in the shield wire 10 of this embodiment, since the inner sleeve 21 is made of stainless steel with excellent strength, it is possible to well keep the shape of the braided shield 12 when forming the molded portion 22*a* by the compression molding. Also, since the stainless steel composing the inner sleeve 21 has low thermal conductivity, thermal influence to the wire main body 20 inside of the shield member can be avoided when conducting the fusion bonding between the tubular body 50 and the metal pipe 11.

Figure 1:
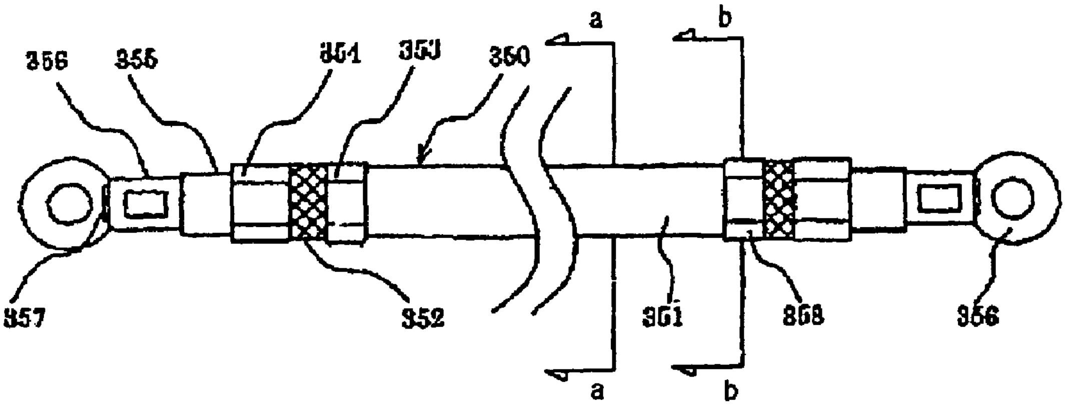
FIG. 1 PRIOR ART
FIG. 1 is a plain view showing the conventional shield wire.
Figure 2:
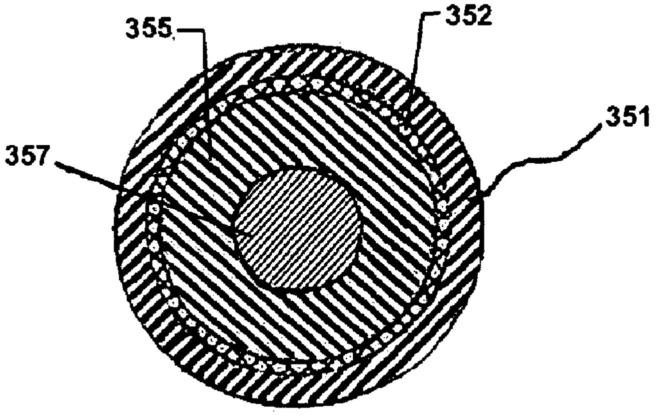
FIG. 2 PRIOR ART
FIG. 2 is a cross sectional view cut along a line a-a in FIG. 1.
Figure 3:
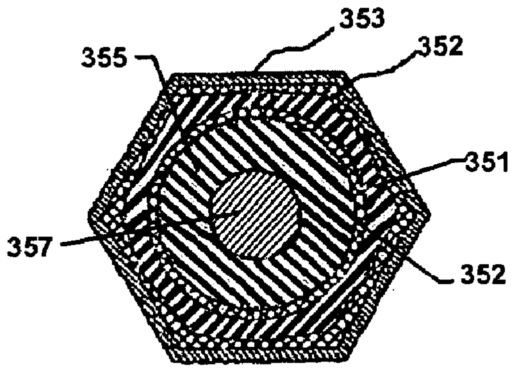
FIG. 3 PRIOR ART
FIG. 3 is a cross sectional view cut along a line b-b in FIG. 1.
Figure 4:
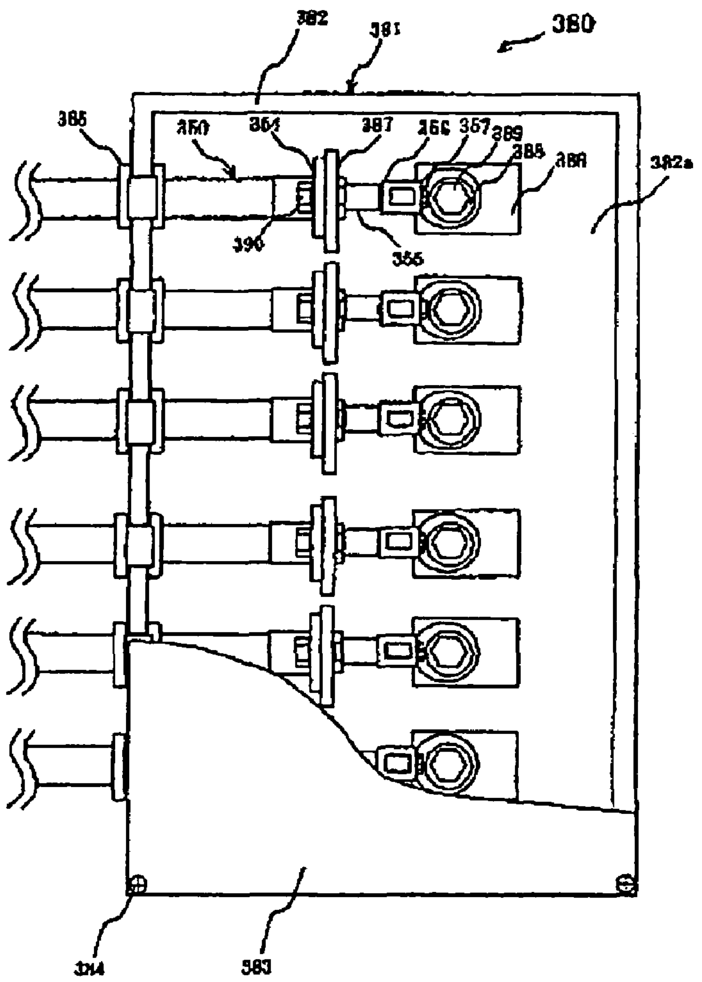
FIG. 4 PRIOR ART
FIG. 4 is a plain view showing the conventional shield wire unit.

The shield wire 10 of this embodiment has more excellent shield effect and higher reliability than the conventional one. In the conventional shield wire 350 as shown in FIG. 1, when the coat layer 351 of the shield member is broken due to heat, vibration etc., the braided shield 352 may be eroded or disconnected to cancel the shield effect. In contrast, in the shield member 10 of the embodiment, the shield layer subjected to heat and vibration is composed of the metal pipe 11 such as an aluminum pipe. The aluminum pipe can effectively conduct and radiate heat. Even when the aluminum pipe is exposed due to the breaking of the coat layer, the shield effect can be kept since the aluminum pipe has good strength and heat resistance. Further, the aluminum pipe has good corrosion resistance since oxide film can be formed on its surface.

As described above, the shield wire 10 of the embodiment can be installed to a place where it may be subject to external shock such as vibration or heat, and the influence of heat generation at the shield member can be overcome effectively. Thus, the shield wire of the embodiment can be suitably applied to an apparatus, which requires heat resistance or corrosion resistance, such as an engine and its peripheral parts (motor, transmission) subjected to heat, an electrical braking system, or an electrical steering system.

In the abovementioned process of making the shield wire of the embodiment, the non-molded portion 22*b* of the outer sleeve 22 is bonded to the proximal part of the metal pipe 11 after the exposed shield 130 is put on the tubular body side end of the metal pipe 11 as shown in FIG. 18. However, the bonding method is not limited to this process.

Figure 21:
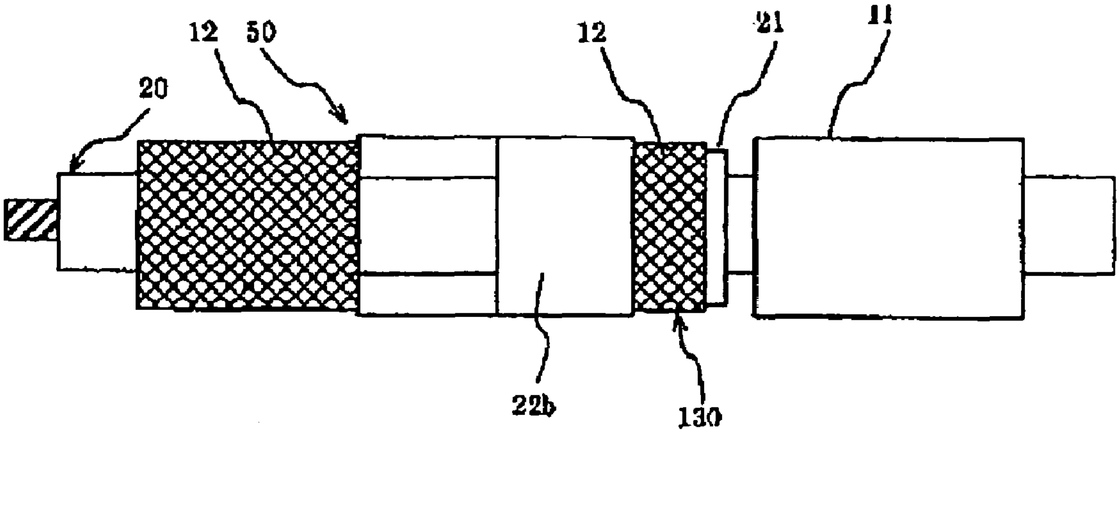
FIG. 21 is a plain view showing a first modification of the connection in FIG. 19.
Figure 22:
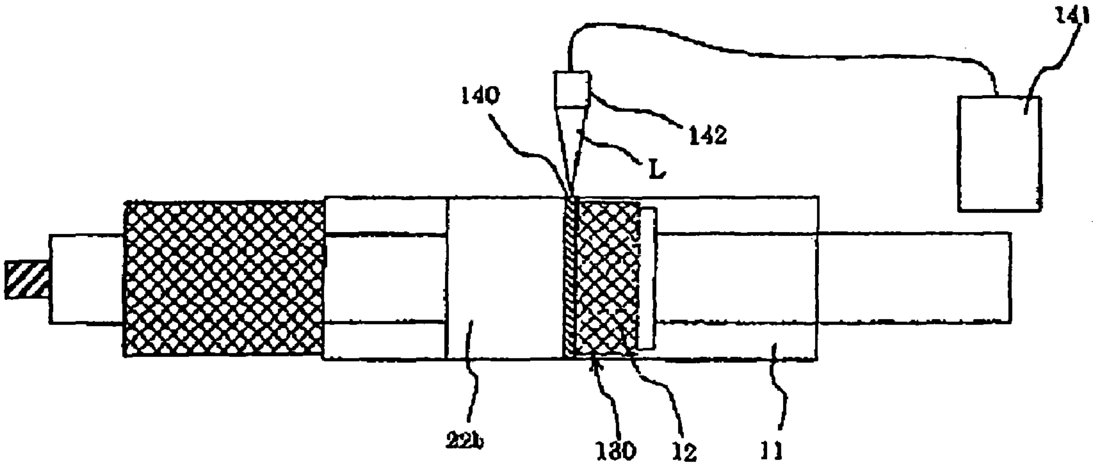
FIG. 22 is a plain view showing a process of welding the tubular body with the metal pipe after the connection in FIG. 21.

Alternatively, as shown in FIG. 21, the metal pipe 11 previously provided may be put on the exposed shield 130 and the metal pipe 11 may be abutted to the non-molded portion 22*b* of the outer sleeve 22. Then, as shown in FIG. 22, the abutted portion may be fusion-bonded to form the welded portion 140. In this case, the inside diameter of the metal pipe 11 is slightly greater than the outside diameter of the braided shield 12.

Figure 23:
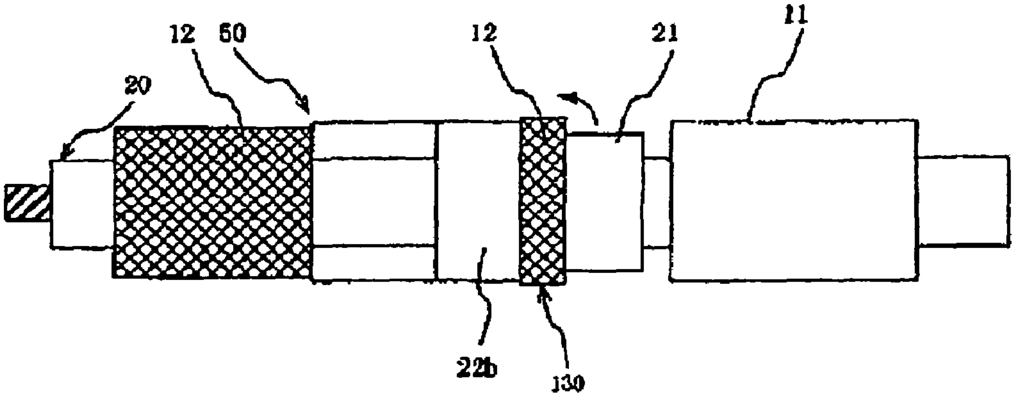
FIG. 23 is a plain view showing a second modification of the connection in FIG. 19.
Figure 24:
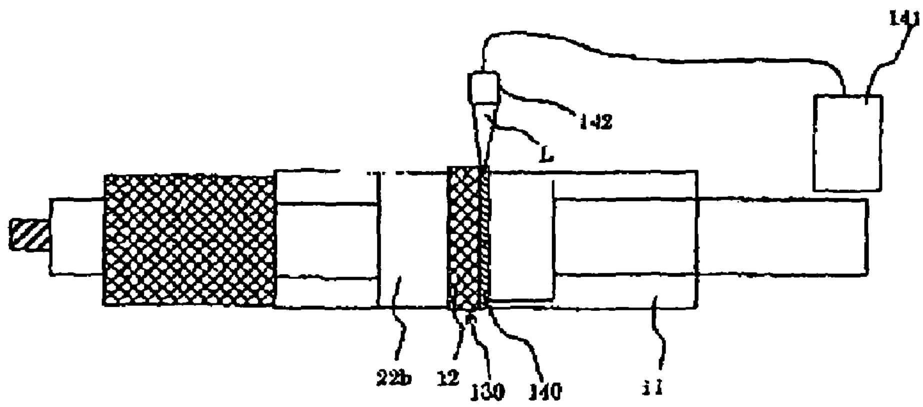
FIG. 24 is a plain view showing a process of welding the tubular body with the metal pipe after the connection in FIG. 23.

Further alternatively, as shown in FIG. 23, after the exposed shield 130 is folded back to the side of the non-molded portion 22*b* of the outer sleeve 22, the metal pipe 11 previously provided may be put on the inner sleeve 21 and the metal pipe 11 may be abutted through the exposed shield 130 to the non-molded portion 22*b* of the outer sleeve 22. Then, as shown in FIG. 24, the abutted portion may be fusion-bonded to form the welded portion 140. In this case, the inside diameter of the metal pipe 11 is slightly greater than the outside diameter of the inner sleeve 21.

Figure 25:
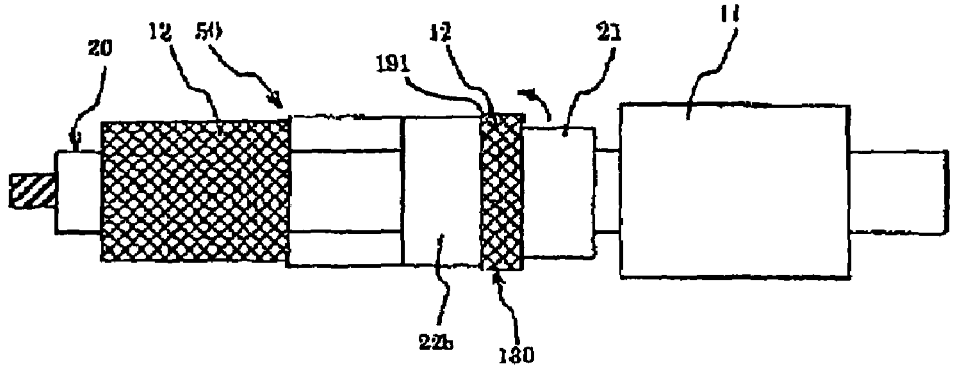
FIG. 25 is a plain view showing a third modification of the connection in FIG. 19.
Figure 26:
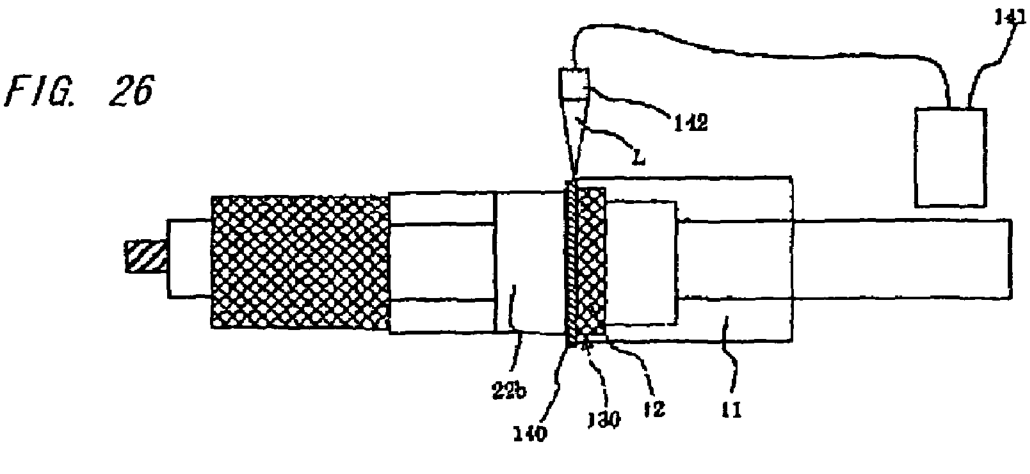
FIG. 26 is a plain view showing a process of welding the tubular body with the metal pipe after the connection in FIG. 25.

Further alternatively, as shown in FIG. 25, after the exposed shield 130 is folded back to the side of the non-molded portion 22*b* of the outer sleeve 22, the metal pipe 11 previously provided may be put on the exposed shield 130 to be near an end 191 of the folded-back part. Then, as shown in FIG. 26, the fusion-bonding may be conducted at the end 191 to form the welded portion 140. In this case, the inside diameter of the metal pipe 11 is slightly greater than the outside diameter of the folded-back part of the exposed shield 130.

In the abovementioned process of making the shield wire of the embodiment, the non-molded portion **22*b* of the outer sleeve 22 is bonded in laser welding to the proximal part of the metal pipe 11**. However, the bonding method is not limited to the laser welding.

Alternatively, the fusion-bonding may be conducted by, e.g., electron beam welding, TIG welding, MIG welding other than the laser welding. The electron beam welding is advantageous in that, since it is conducted in a vacuum chamber, occurrence of oxide can be prevented and thermal influence to part other than subjected to the welding can be reduced. Therefore, decrease in strength at the welded portion 140 can be prevented. The TIG welding is advantageous in that oxidation can be prevented by shield gas. Further, the welding cost can be reduced due to the simple structure. The MIG welding is advantageous in that the welding can be conducted supplying a weld metal while preventing oxidation by shield gas. Therefore, fine wires composing the braided shield 12 can be pressed down by the weld metal. This allows the welded portion 140 to be good in appearance.

Further, a solid bonding method such as ultrasonic bonding and friction stir welding (FSW) may be used instead of the welding.

Housing to be Connected with the Shield Wire

A housing in a preferred embodiment of the invention will be described below.

Figure 32:
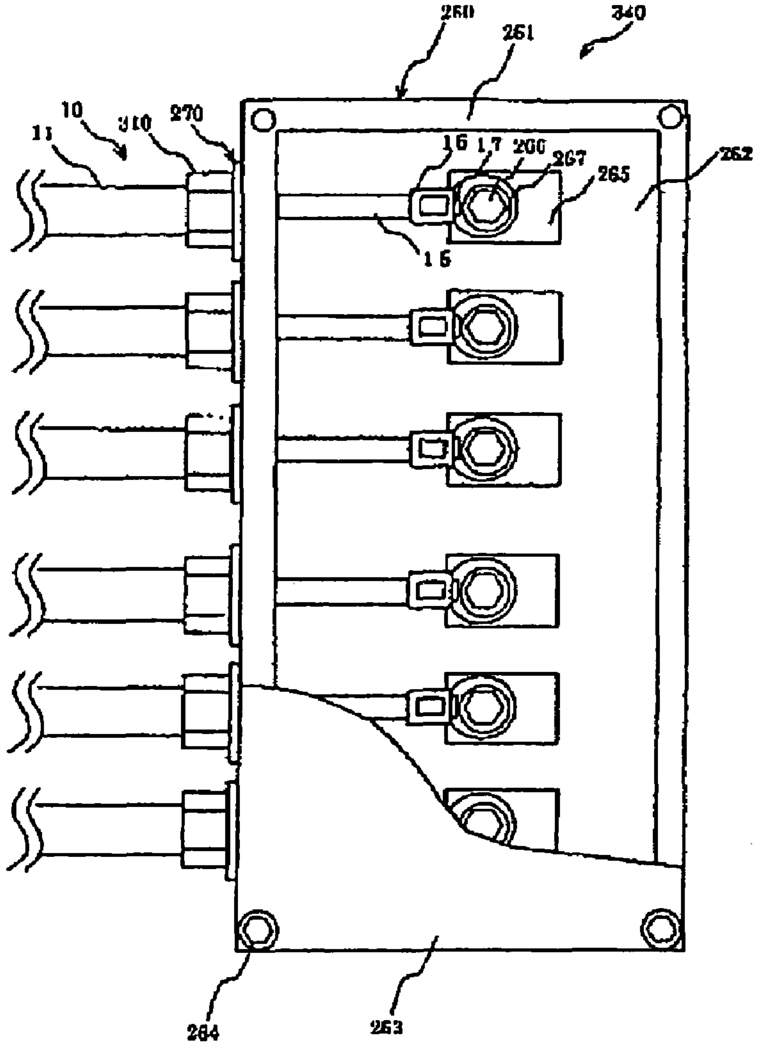
FIG. 32 is a partially broken plain view showing a housing in a preferred embodiment of the invention.

FIG. 32 is a partially broken plain view showing the housing in the preferred embodiment of the invention.

As shown, the housing 260 of the embodiment is structured such that at least one shield wire 10 (6 wires in FIG. 32) of the embodiment as shown in FIG. 6 is connected thereto.

The housing 260 is composed of a frame member 261 with a bottom 262, and a housing cover 263 as a lid of the frame member 261. The housing cover 263 is fixed through a fastening means 264 such as a bolt or screw to the frame member 261.

Figure 34:
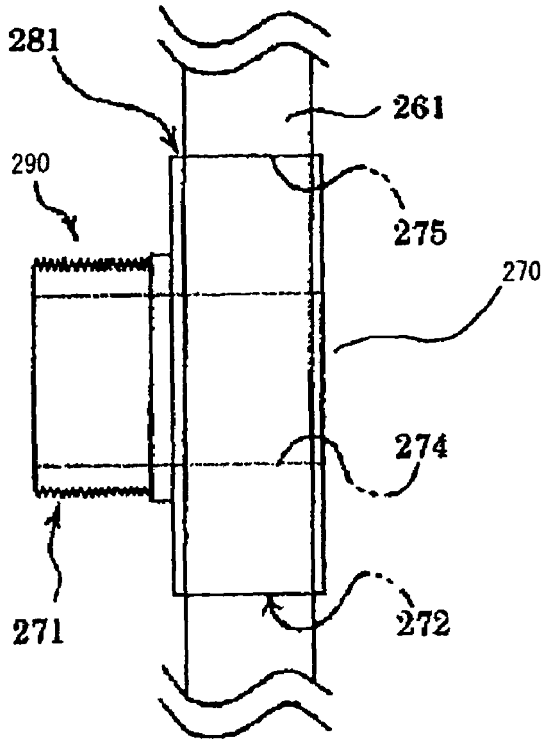
FIG. 34 is a plain view showing a state after attaching the connection part of the shield wire to the frame member.

The frame member 261 is provided with a convex shield wire connecting portion 290 on the side face (on the left side in FIG. 32) of the frame member 261. The number of the shield wire connecting portions 290 corresponds to the number of the shield wires. As shown in FIG. 34, the shield wire connecting portion 290 is provided with a cylindrical protrusion 271 protruded from the frame member 261, and the protrusion 271 is provided with a male threaded portion 273 on the outer circumference of the protrusion 271. Further, the shield wire connecting portion 290 has, inside thereof, an insertion hole (wire main body inserting hole) 274 for inserting the wire main body 20.

The frame member 261 has a terminal base 265 provided at the bottom 262. A wiring (not shown) is connected to the terminal base 265 while penetrating the bottom 262.

The lower surface of the housing 260, i.e., the frame member 261, is put on the surface of a transmission casing etc. and is grounded.

The frame member 261 is provided with a ring-shaped groove (not shown) on the upper surface and lower surface. A seal member such as an O-ring is fitted into the groove. Due to the seal member, airtightness can be secured between the housing 260 and the transmission casing, and between the frame member 261 and the housing cover 263.

The housing 260 is made of metal, desirably aluminum or aluminum alloy except the bottom 262 of the frame member 261. The housing cover 263 may be made of a material, such as resin, other than metal. The bottom 262 is made of an insulating material.

The housing 260 and the shield wire connecting portion 290 can be made of aluminum or aluminum alloy, preferably Al—Si—Mg alloys with good corrosion resistance and brazing property. The housing 260 may be a box member made of A6063 and with a thickness of 15 mm. The shield wire connecting portion 290 may be made of A6063 and have an outside diameter of 16 mm and a length of 20 mm in connection part with the housing 260.

An example of forming the shield wire connecting portion 290 will be described below.

Figure 33:
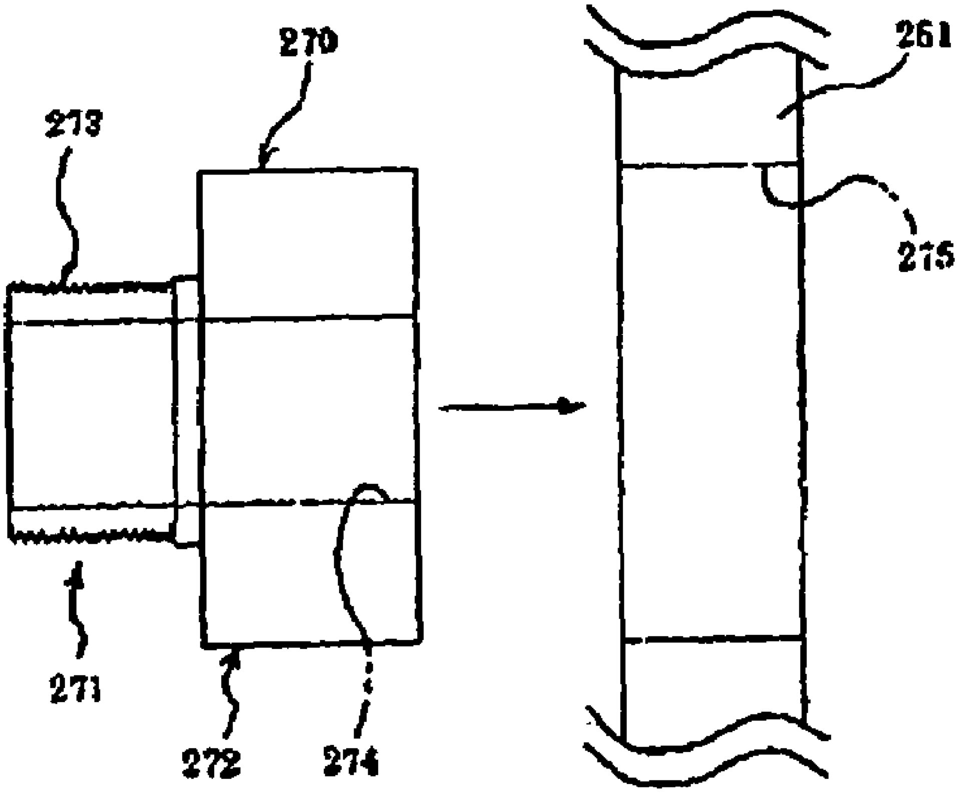
FIG. 33 is a plain view showing a process of attaching a connection part of the shield wire to a frame member of the housing.

As shown in FIG. 33, a penetrating hole 275 is formed on the side face of the frame member 261. A convex connection member 270 is inserted into the penetrating hole 275 as shown in FIG. 34. The connection member 270 is composed of a fit portion 272 which has the same shape and size as the penetrating hole 275, and the cylindrical protrusion 271. Then, by welding a boundary portion 281 between the frame member 261 and the connection member 270, the connection member 270 is welded through a welded portion 291 to the frame member 261 to have the shield wire connecting portion 290.

In the above embodiment, the housing 260 is structured such that the frame member 261 is separate from the connection member 270. However, the structure of the housing 260 is not limited to this. For example, the frame member 261 and the connection member 270 can be integrally formed by casting. In this case, the shield wire connecting portion 290 can be made by forming the male-threaded portion 273 on the outer circumference of the protrusion 271 of the connection member 270 integrated with the frame member 261.

In the above embodiment, the housing 260 is structured such that the male-threaded portion 273 is formed on the outer circumference of the protrusion 271. However, the structure of the housing 260 is not limited to this. For example, a female-threaded portion may be formed on the inner face of the insertion hole 274 of the connection member 270. In this connection member 270, the female-threaded portion has an inside diameter greater than the insertion hole 274, and the diameter-increasing portion 320 (See FIG. 38) of the metal pipe 11 is abutted and seated to a step portion between the female-threaded portion and the insertion hole 274. The connection member 310 (See FIG. 37) to be screw-connected to the connection member 270 with the step portion can have a male-threaded portion. Thus, the male-threaded portion of the connection member 310 can be screw-connected to the female-threaded portion of the connection member 270 (insertion hole 274).

Connecting Method Between the Shield Wire and the Housing

A connecting method between the shield wire and the housing will be described below.

Figure 35:
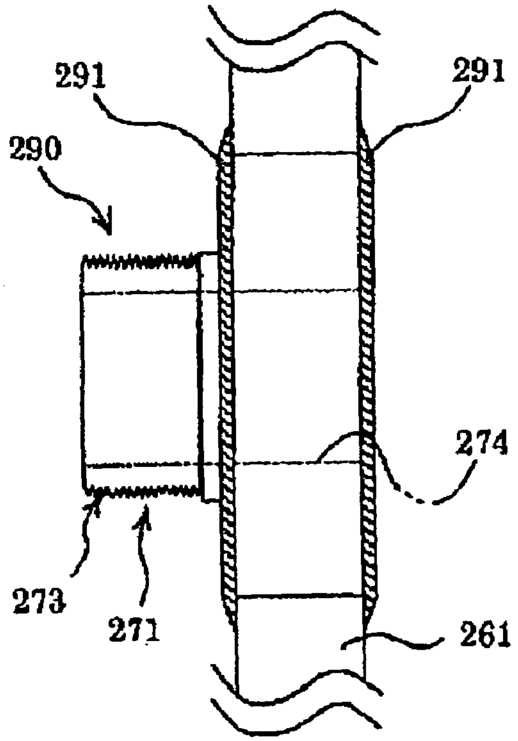
FIG. 35 is a plain view showing a state after welding the connection part of the shield wire with the frame member.
Figure 38:
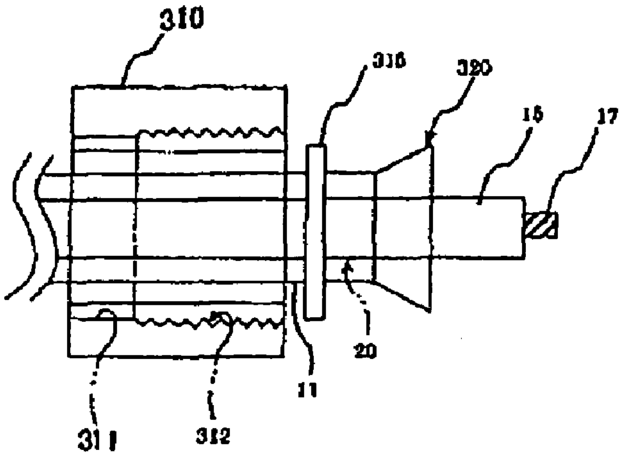
FIG. 38 is a plain view showing a state after conducting a diameter-increasing process at the non-tubular body side of the metal pipe in the shield wire in FIG. 37.
Figure 39:
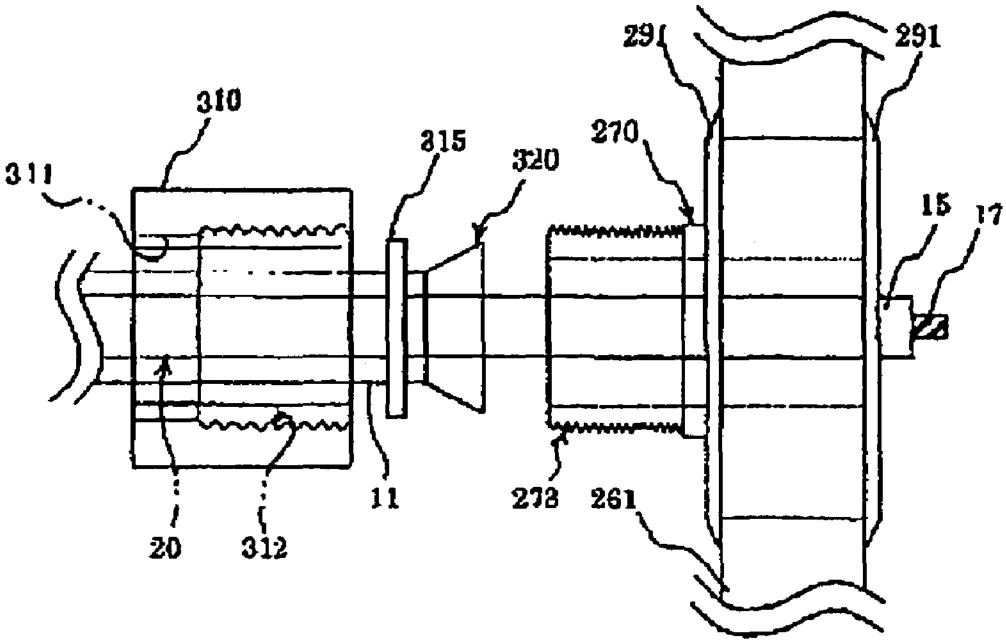
FIG. 39 is a plain view showing a process of abutting the shield wire with the increased diameter to the frame member with the shield wire connection part welded therewith.

First, the wire main body 20 protruding from the end of the metal pipe 11 in the shield wire 10 with the end structure as shown in FIG. 38 is inserted into the insertion hole 274 of the shield wire connecting portion 290 in the frame member 261 as shown in FIG. 35. FIG. 39 shows the insertion state.

Figure 40:
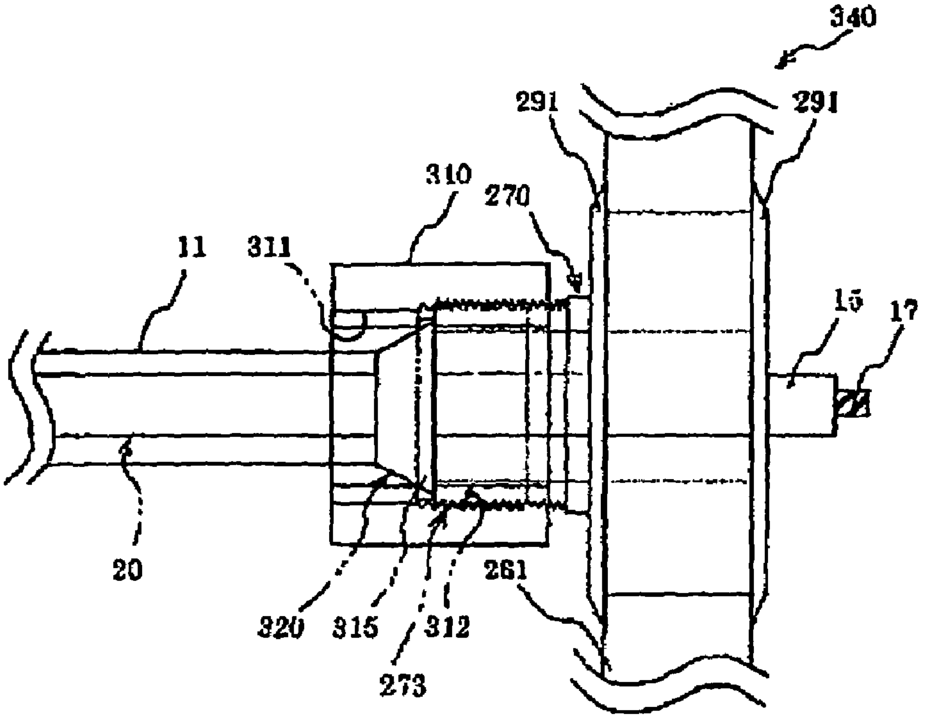
FIG. 40 is a plain view showing a state after connecting the shield wire through the connection member to the shield wire connection part.

Then, as shown in FIG. 40, the end of the diameter-increasing portion 320 formed at the end of the metal pipe 11 is abutted to the connection member 270 in the shield wire connecting portion 290. Then, the female-threaded portion 312 formed on the inner face 311 of the diameter-increasing portion 320 is screw-connected to the male-threaded portion 273 formed on the outer face of the protrusion 271. While the female-threaded portion 312 is screw-connected to the male-threaded portion 273 in a sufficient length, the washer 315 is pressed against the diameter-increasing portion 320 by the connection member 310. Due to the pressing, the washer 315 is subjected to plastic deformation to gradually increase the opening diameter thereof. As a result, the deformed washer 315 allows the sealing of a gap between the female-threaded portion 312 of the connection member 310 and the male-threaded portion 273 of the protrusion 271. Further, the electrical connection can be secured between the metal pipe 11 and the frame member 261.

Then, the conductor 17 of the wire main body 20 being inserted into the frame member 261 is screw-connected through a washer 267 and a bolt 266 to the terminal base 265 provided on the bottom 262 as shown in FIG. 32. Thereby, the wire main body 20 of the shield wire 10 is electrically connected to the housing 260.

Finally, the housing cover 263 is put on the frame member 261, and the housing cover 263 is screw-connected through the fastening means 264 to the frame member 261. Thus, the connection of the shield wire 10 and the housing 260 is completed to have a shield wire unit 340.

Figure 47:
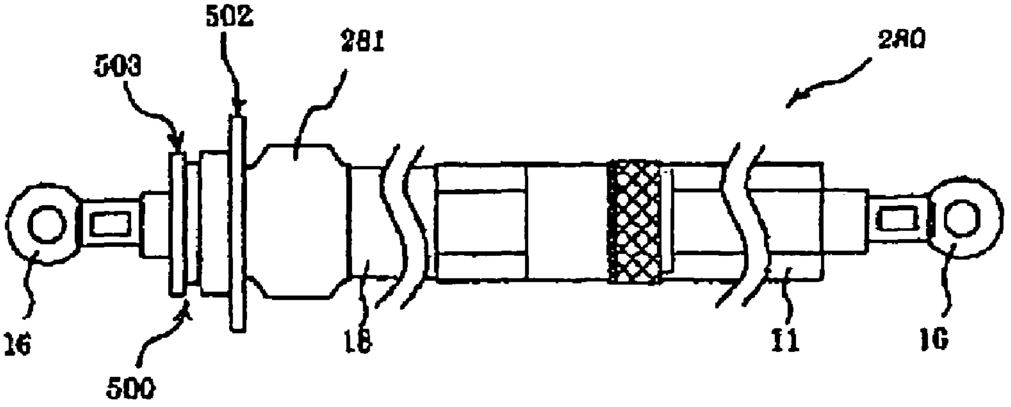
FIG. 47 is a plain view showing a process of forming an insulating cover.
Figure 48:
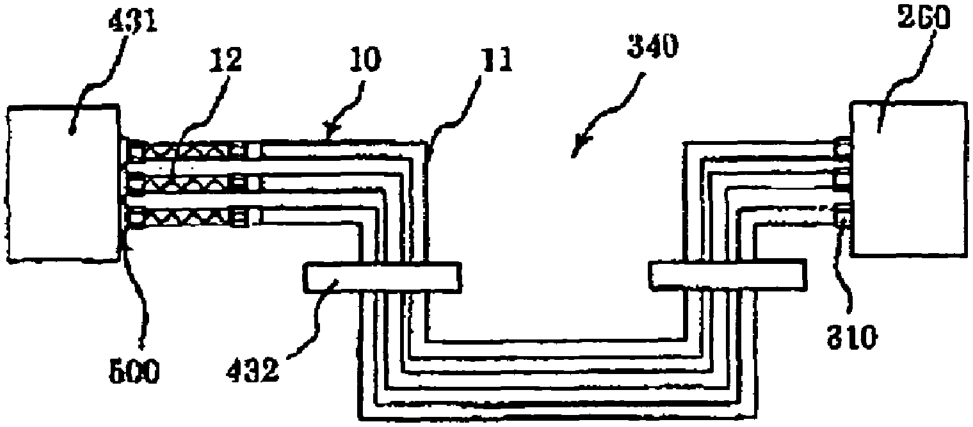
FIG. 48 is a schematic diagram showing a connection state of a shield wire unit in a preferred embodiment of the invention.

In the shield wire unit 340, the shield connector 354 side (the left side in FIG. 48) of the shield wire 10 is connected to an inverter housing 431. The apparatus connecting portion 503 of the shield connector 500 is inserted into a connection hole previously formed in the inverter housing 431 until when the flange 502 as shown in FIG. 47 is abutted to the inverter housing 431. Then, the circumference of the flange 502 is bonded to the inverter housing 431 through a fastening means such as a bolt. In this case, it is preferred that the flange 502 is, on its side face to the apparatus connecting portion 503, provided with a groove for fitting a seal member such as an O-ring therein. Thereby, the sealing property can be enhanced at the connecting part between the flange 502 and the inverter housing 431. As shown in FIG. 48, plural shield wires 10 (3-phase 3 wires in FIG. 48) are bundled and aligned through a fixing guide member 432. Thereby, the connection property of the shield wire unit 340 to the inverter housing 431 can be enhanced.

Effects of the Connecting Method of the Embodiment

Figure 5:
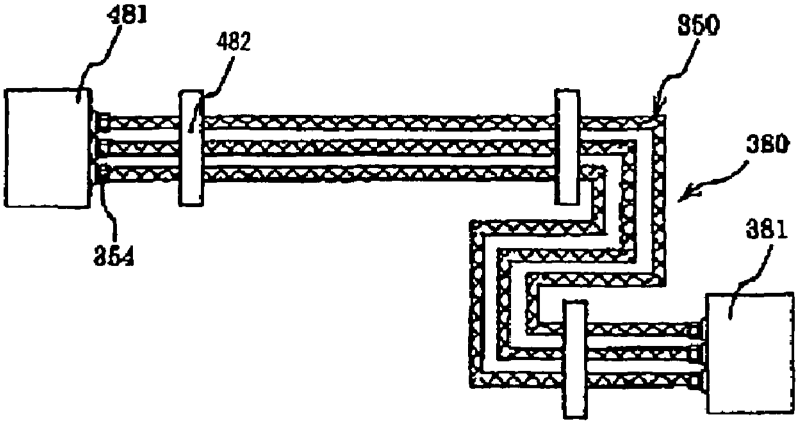
FIG. 5 PRIOR ART
FIG. 5 is a schematic diagram showing a connection state of the conventional shield wire unit.

In the shield wire unit 340 of the embodiment, the shield connector 500 provided on the inverter side of the shield wire 10 is mechanically connected to the inverter housing 431. Thereby, the ground connection between the shield wire 10 and the inverter housing 431 can be formed together outside of the inverter housing 431. Therefore, in the shield wire unit 340 of the embodiment, the conventional ground connection need not be made such that the screw-connected terminal provided on the shield connector 354 is connected through a ground line to the inverter housing 481 when the shield wire 350 as shown in FIG. 1 is connected to the inverter housing 481 as shown in FIG. 5. Thus, the connecting work between the shield wire unit 340 and the inverter housing 431 can be simplified and facilitated.

In the connecting method of the embodiment, the end of the metal pipe 11 is electrically connected to the shield wire connecting portion 290 by screw-bonding the connection member 310 to the connection member 270 of the shield wire connecting portion 290. Thus, the ground connection between the shield member of the shield wire 10 and the housing 260 can be made outside of the housing 260. Therefore, in the connecting method of the embodiment, the conventional complicated ground connection need not be made such that, inside the frame member 382 of the housing 381, the shield connector 354 of the shield wire 350 is screw-connected through the bolt 390 to the ground terminal base 387 when the shield wire 350 is connected to the housing 381 as shown in FIG. 5. Thus, the connecting work between the shield wire 10 and the housing 260 can be simplified and facilitated.

Prior to connecting the metal pipe 11 of the shield wire 10 to the shield wire connecting portion 290 of the housing 260, the metal pipe 11 is previously bent into a predetermined shape by bending process. Therefore, when the shield wire 10 is connected to the housing 260, i.e., when the metal pipe 11 is connected to the shield wire connecting portion 290, the connected portion can be protected from being applied with excessive force.

Further, since the metal pipe 11 is mechanically connected to the housing 260, remaining stress is less likely to occur at the connecting portion between the shield wire connecting portion 290 and the connection member 310, as compared to the connection by welding. Therefore, the metal pipe 11 can be prevented from lowering in strength.

In the shield wire unit 340 of the embodiment, the shield wire 10 is mechanically and electrically connected to the housing 260 in advance. Therefore, when the shield wire unit 340 is used as a current feeding unit (e.g., a transmission side current feeding unit for a car), the installation to a current-fed apparatus can be facilitated to offer an excellent handling property. When the entire frame member of the housing 260 serves as a ground member, the ground connection process between the shield wire and the housing can be removed which has been conducted by its manufacturer (e.g., car maker).

Modification of the Shield Wire

A modification of the shield wire 10 will be described below.

In the above embodiment, the tubular body 50 of the shield wire 10 as shown in FIG. 11 is composed of the inner sleeve 21, the braided shield 12 and the outer sleeve 22 which are each a separate member.

In this modification, a tubular body is composed of an integrated member of an inner sleeve and an outer sleeve.

Figure 27:
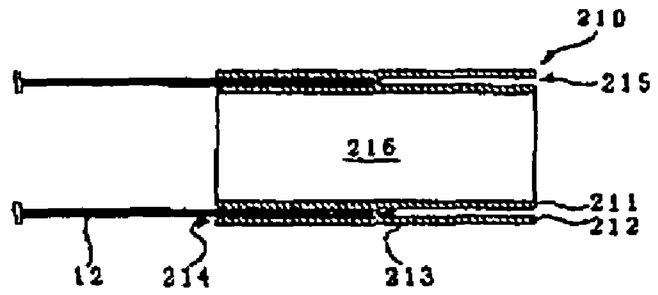
FIG. 27 is a cross sectional view showing a first modification of the tubular body in FIG. 11.

In detail, as shown in FIG. 27, a sleeve member 210 is provided which comprises the inner sleeve 211, the outer sleeve 212 with an inside diameter greater than an outside diameter of the inner sleeve 211, and a ring-shaped link portion 213 to integrally link the inner sleeve 211 with the outer sleeve 212. The link portion 213 is, for example, disposed at an intermediate position in the longitudinal direction (lateral direction in FIG. 27). The position of the link portion 213 is not limited to this and may be at an end of the sleeve member 210. The sleeve member 210 can be integrally molded by casting etc.

The sleeve member 210 comprises two spaces 214, 215 to laterally sandwich the link portion 213 between the inner sleeve 211 and the outer sleeve 212. The braided shield 12 is inserted into one space (space 214 in FIG. 27), and the metal pipe 11 is inserted into the other space (space 215 in FIG. 27) as described later.

Figure 28:
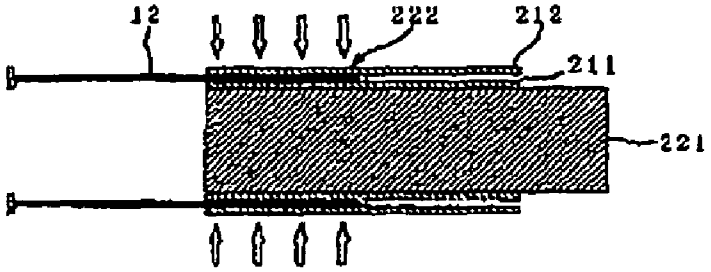
FIG. 28 is a cross sectional view showing a process of bonding the tubular body in FIG. 27.

In making the shield wire of the modification, the braided shield 12 is inserted into the space 214 of the sleeve member 210. A part corresponding to the braided shield 12 inserted into the space 214 forms a superposed portion 222. Then, as shown in FIG. 28, a columnar member 221 is inserted into an internal space 216 of the sleeve member 210. Then, at the superposed portion 222, the outer sleeve 212, the braided shield 12 and the inner sleeve 211 are mechanically bonded by compression bonding such that external pressure is applied to the outer sleeve 212 by using a pressing means (e.g., a jig). Due to the mechanical bonding, the contact area between the braided shield 12 and the outer sleeve 212 or the inner sleeve 211 can be secured to increase the electrical contact. The compression bonding is conducted all around the circumference of the sleeve member 210.

Figure 29:
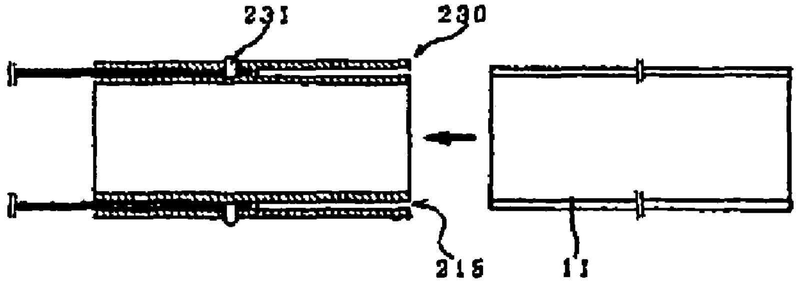
FIG. 29 is a cross sectional view showing a process of conducting the electrical connection to the tubular body after the bonding.

Then, as shown in FIG. 29, a part 231 of the superposed portion 222 mechanically bonded is fusion-bonded such that the braided shield 12, the outer sleeve 212 and the inner sleeve 211 are completely electrically bonded at the fusion-bonded part 231. Thereby, a tubular body 230 can be obtained. The partial fusion bonding can be conducted by applying heat to outside of the outer sleeve 212 by using a known method such as TIG welding, MIG welding, electron beam welding and laser welding.

Figure 30:
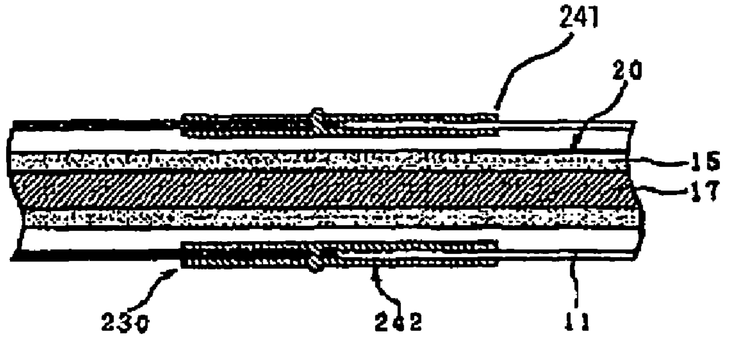
FIG. 30 is a cross sectional view showing a process of connecting the tubular body in FIG. 29 with the metal pipe.

Then, as shown in FIG. 30, the metal pipe 11 is inserted into the space 215 of the sleeve member 210. A part corresponding to the metal pipe 11 inserted into the space 215 forms a superposed portion 242. Then, the wire main body 20 previously inserted into the metal pipe 11 is inserted into the tubular body 230.

Figure 31:
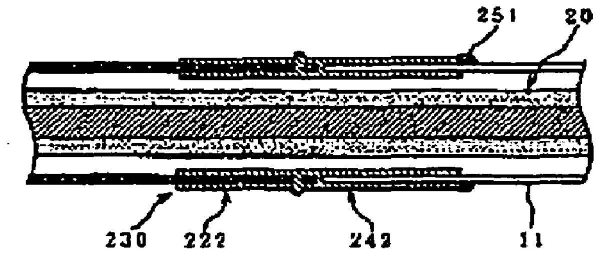
FIG. 31 is a plain view showing a state after welding the tubular body with the metal pipe.

Then, a boundary portion 241 between the tubular body 230 and the metal pipe 11 is fusion-bonded by MIG welding etc. to form a fusion-bonded portion 251 as shown in FIG. 31. The fusion bonding is continuously conducted all around the circumference of the tubular body 230. Thus, at the fusion-bonded portion 251, the sleeve member 210 of the tubular body 230 is securely electrically connected to the metal pipe 11.

Finally, the sleeve member 210 is insulated. For example, a heat-shrinkable tube is provided which has a length sufficient to cover the sleeve member 210. After covering the sleeve member 210 with the heat-shrinkable tube, the heat-shrinkable tube is shrunk by hot-air blow to be closely in contact with the shield members to insulate them.

In the above shield wire using the tubular body 230, the braided shield 12 is electrically connected in direction contact to the sleeve member 210, and the metal pipe 11 is electrically connected in direction contact to the sleeve member 210. Namely, the braided shield 12 is in electrical connection with the metal pipe 11 indirectly through the sleeve member 210. Meanwhile, since the braided shield 12 has a mesh-like porous structure, even when spot welding is conducted while the braided shield 12 is directly in contact with the metal pipe 11, the electrical contact is not so good at the welded part. However, in the above shield wire using the tubular body 230, the planar electrical bonding can be in wide range obtained between the braided shield 12 and the sleeve member 210, and between the sleeve member 210 and the metal pipe 11. Therefore, by electrically connecting the braided shield 12 with the metal pipe 11 indirectly through the sleeve member 210, the electrical connection therebetween can be further secured.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A shield wire comprising:

a wire main body that comprises a conductor and an insulation covering the conductor, the conductor comprising a single wire or a stranded wire;

a metal pipe;

a tubular body comprising an inner sleeve, a braided shield and an outer sleeve, the tubular body being electrically connected by welding to the metal pipe at an end thereof; and a first connector member with a flange that is electrically connected to the tubular body at an other end of the tubular body where the tubular body is not connected to the metal pipe, wherein the wire main body is shielded at its outer circumference along a longitudinal direction by an elongated part comprising the metal pipe and another elongated part comprising the braided shield.

2. The shield wire according to claim 1, wherein:

the first connector member comprises a tubular body connecting portion and an apparatus connecting portion, and the flange of the first connector member is sandwiched by the tubular body connecting portion and the apparatus connecting portion.

3. The shield wire according to claim 1, wherein:

the braided shield comprises copper or copper alloys, and the metal pipe and the first connector member comprise aluminum or aluminum alloys.

4. The shield wire according to claim 1, wherein:

the braided shield, the metal pipe and the first connector member comprise aluminum or aluminum alloys.

5. The shield wire according to claim 1, further comprising a tubular second connector member, wherein the second connector member is inserted into the metal pipe at an end of the metal pipe where the metal pipe is not connected to the tubular body.

6. The shield wire according to claim 5, wherein:

the metal pipe comprises a cone-shaped diameter-increasing portion formed at the end of the metal pipe where the metal pipe is not connected to the tubular body.

7. The shield wire according to claim 5, wherein:

the second connector member comprises a nut member with a female-threaded portion on an inner face thereof.

8. The shield wire according to claim 5, wherein:

the second connector member comprises a nut member with a male-threaded portion on an outer face thereof.

9. The shield wire according to claim 5, wherein:

the first connector member comprises a tubular body connecting portion and an apparatus connecting portion, and the flange of the first connector member is sandwiched by the tubular body connecting portion and the apparatus connecting portion.

10. The shield wire according to claim 5, wherein:

the braided shield comprises copper or copper alloys, and the metal pipe, the first connector member and the second connector member comprise aluminum or aluminum alloys.

11. The shield wire according to claim 5, wherein:

the braided shield, the metal pipe, the first connector member and the second connector member comprise aluminum or aluminum alloys.

12. A housing comprising:

a convex shield wire connecting portion for connecting the housing with a shield wire that comprises a wire main body that comprises a conductor, wherein the conductor comprises a single wire or a stranded wire, and an insulation covering the conductor; a metal pipe; a tubular body comprising an inner sleeve, a braided shield and an outer sleeve, the tubular body being electrically connected by welding to the metal pipe at an end thereof; and a first connector member with a flange that is electrically connected to the tubular body at an other end of the tubular body where the tubular body is not connected to the metal pipe, wherein the wire main body is shielded at its outer circumference along a longitudinal direction by an elongated part comprising the metal pipe and another elongated part comprising the braided shield, wherein the housing comprises a metal, and wherein the shield wire connecting portion comprises a wire main body inserting hole into which the wire main body is inserted.

13. The housing according to claim 12, wherein:

the housing and the shield wire connecting portion comprise aluminum or aluminum alloys.

14. The housing according to claim 12, wherein:

the shield wire connecting portion comprises a protrusion for connecting the shield wire, and the protrusion comprises a threaded portion through which the shield wire is screw-connected to the shield wire connecting portion.

15. A method of connecting a shield wire with a housing, comprising the steps of:

providing the shield wire that comprises: a wire main body that comprises a conductor, wherein the conductor comprising a single wire or a stranded wire, and an insulation covering the conductor; a metal pipe; a tubular body comprising an inner sleeve, a braided shield and an outer sleeve, the tubular body being electrically connected by welding to the metal pipe at an end thereof; and a first connector member with a flange that is electrically connected to the tubular body at an other end of the tubular body where the tubular body is not connected to the metal pipe, wherein the wire main body is shielded at its outer circumference along a longitudinal direction by an elongated part comprising the metal pipe and another elongated part comprising the braided shield;

providing the housing that comprises a convex shield wire connecting portion for connecting the shield wire with the housing, wherein the housing comprises a metal, the shield wire connecting portion comprises a wire main body inserting hole into which the wire main body is inserted;

inserting a second connector member into the metal pipe at an end of the metal pipe where the metal pipe is not connected to the tubular body;

abutting the metal pipe to the shield wire connecting portion at the end of the metal pipe where the metal pipe is not connected to the tubular body; and mechanically connecting the second connector member to the shield wire connecting portion.

16. The method according to claim 15, wherein:

the inserting step is followed by increasing a diameter of the metal pipe at the end thereof where the metal pipe is not connected to the tubular body so as to be cone-shaped.

17. The method according to claim 15, wherein:

the abutting step is conducted such that the end of the metal pipe where the metal pipe is not connected to the tubular body is seated to the wire main body inserting hole of the shield wire connecting portion.

18. The method according to claim 15, wherein:

the mechanically connecting step is conducted such that a female-threaded portion formed on an inner face of the second connector member is screw-connected to a male-threaded portion formed on an outer face of the shield wire connecting portion.

19. The method according to claim 15, wherein:

the mechanically connecting step is conducted such that a male-threaded portion formed on an outer face of the second connector member is screw-connected to a female-threaded portion formed on an inner face of the shield wire connecting portion.

20. A shield wire unit comprising:

a shield wire; and a housing connected with the shield wire, wherein the shield wire comprises: a wire main body that comprises a conductor, wherein the conductor comprises a single wire or a stranded wire, and an insulation covering the conductor; a metal pipe; a tubular body comprising an inner sleeve, a braided shield and an outer sleeve, the tubular body being electrically connected by welding to the metal pipe at an end thereof; and a first connector member with a flange that is electrically connected to the tubular body at an other end of the tubular body where the tubular body is not connected to the metal pipe, wherein the wire main body is shielded at its outer circumference along a longitudinal direction by an elongated part comprising the metal pipe and another elongated part comprising the braided shield, the housing comprises a convex shield wire connecting portion for connecting the shield wire with the housing, wherein the housing comprises a metal, the shield wire connecting portion comprises a wire main body inserting hole into which the wire main body is inserted, a second connector member is inserted into the metal pipe at an end of the metal pipe where the metal pipe is not connected to the tubular body, the metal pipe is abutted to the shield wire connecting portion at the end of the metal pipe where the metal pipe is not connected to the tubular body, and the second connector member is mechanically connected to the shield wire connecting portion.

* * * * *